United States Patent
Kawanishi et al.

(10) Patent No.: US 7,324,177 B2
(45) Date of Patent: *Jan. 29, 2008

(54) POLARIZING PLATE AND LIQUID CRYSTAL DISPLAY USING THE SAME

(75) Inventors: Hiroyuki Kawanishi, Minami-Ashigara (JP); Yoji Ito, Minami-Ashigara (JP)

(73) Assignee: Fujifilm Corporation, Minato-Ku, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/498,739

(22) Filed: Aug. 4, 2006

(65) Prior Publication Data

US 2006/0268199 A1  Nov. 30, 2006

Related U.S. Application Data

(63) Continuation of application No. 10/475,966, filed on Jun. 16, 2004, now Pat. No. 7,119,873.

(30) Foreign Application Priority Data

Apr. 27, 2001 (JP) .......................... P.2001-132547
Aug. 2, 2001 (JP) .......................... P.2001-234971

(51) Int. Cl.
*G02F 1/1335* (2006.01)
(52) U.S. Cl. ..................................... 349/112
(58) Field of Classification Search ................ 349/112; 359/599
See application file for complete search history.

(56) References Cited

U.S. PATENT DOCUMENTS

| | | | |
|---|---|---|---|
| 5,387,463 A | 2/1995 | Nakamura et al. | |
| 5,880,800 A | 3/1999 | Mikura et al. | |
| 5,949,506 A | 9/1999 | Jones et al. | |
| 6,111,699 A | 8/2000 | Iwata et al. | |
| 6,348,960 B1 * | 2/2002 | Etori et al. | 349/112 |
| 6,416,910 B1 * | 7/2002 | Iimura et al. | 430/7 |
| 6,480,249 B2 * | 11/2002 | Iwata et al. | 349/112 |
| 6,624,937 B2 | 9/2003 | Kashima | |

FOREIGN PATENT DOCUMENTS

| | | |
|---|---|---|
| EP | 1 089 093 A2 | 4/2001 |
| JP | 11-305010 | 11/1999 |
| JP | 2001-324608 | 11/2001 |
| TW | 424159 B | 3/2001 |

* cited by examiner

*Primary Examiner*—James A. Dudek
(74) *Attorney, Agent, or Firm*—Buchanan Ingersoll & Rooney PC

(57) ABSTRACT

The present invention is to provide a polarizing plate capable of providing a liquid crystal display which is widened in the angle of visibility (in particular, the downward angle of visibility), hardly accompanied by thickening of the thickness of a liquid crystal panel, lowering of contrast due to variation of a visual angle, gradation reverse, black-and-white reverse, and hue variation, by using a light-scattering layer, a polarizer and an optical anisotropic layer comprising a liquid crystal compound, and the polarizing plate of the present invention comprises a polarizer; an optical anisotropic layer containing a liquid crystal compound; and a light-scattering layer containing a light-transmitting resin and a light-transmitting diffusing agent having a refractive index different from that of the light-transmitting resin, wherein the light-transmitting diffusing agent is dispersed in the light-transmitting resin, and liquid crystal display using the same.

11 Claims, 1 Drawing Sheet

POLARIZING PLATE AND LIQUID CRYSTAL DISPLAY USING THE SAME

CROSS-REFERENCE TO RELATED APPLICATIONS

This application is a continuation of application Ser. No. 10/475,966, filed Jun. 16, 2004, now U.S. Pat. No. 7,119,873 the contents of which are incorporated herein by reference, which is the national stage under 35 U.S.C. §371 of International Application No. PCT/JP02/04270, filed on Apr. 26, 2002, which in turn claims priority to Japanese Application Nos. 2001-132547 and 2001-234971, filed Apr. 27, 2001 and Aug. 2, 2001, respectively.

TECHNICAL FIELD

The present invention relates to a polarizing plate having an optical anisotropic layer and a liquid crystal display using the same.

BACKGROUND ART

A liquid crystal display in general comprises a polarizing plate and a liquid crystal cell. In a TN mode TFT liquid crystal display which is the mainstream now, a liquid crystal display of high grade display has been realized by the technique of inserting an optical compensating film between a polarizing plate and a liquid crystal cell as disclosed in JP-A-8-50206 (the term "JP-A" as used herein means an "unexamined published Japanese patent application"). However, there is a drawback in this technique that the thickness of a liquid crystal display itself becomes thick.

There is disclosed in JP-A-1-68940 that it is possible to make front contrast high without thickening liquid crystal display by using an oval polarizing plate comprising a polarizing film having a phase contrast plate on one surface and a protective film on the other surface. However, it has been found that the phase contrast film disclosed in this patent is liable to cause phase difference due to distortion by heat, and so there is a problem in durability.

The problem of generation of phase difference due to distortion has been solved by the technique of directly using an optical compensating film comprising a transparent support having coated thereon an optical anisotropic layer comprising a discotic compound as the protective film of a polarizing plate as disclosed in JP-A-7-191217 and EP-A-0911656.

However, a problem that the downward gradation reverse of a panel occurs in the liquid crystal display still remains.

With respect to this problem, the grade of display has been greatly improved by providing a light-diffusing means on the surface of viewer's side as disclosed in Japanese Patent 2822983, JP-A-2001-33783 and JP-A-2001-56461. However, as the specific light-diffusing means according to these patents, highly controlled lens structure or a light-diffusing means having diffraction structure are necessary, which means are very expensive and mass production is extremely difficult.

DISCLOSURE OF THE INVENTION

A first object of the present invention is to provide a polarizing plate capable of providing a liquid crystal display which is widened in the angle of visibility (in particular, the downward angle of visibility), hardly accompanied by thickening of the thickness of a liquid crystal panel, lowering of contrast due to variation of a visual angle, gradation reverse, black-and-white reverse, and hue variation, by using a light-scattering layer, a polarizer and an optical anisotropic layer comprising a liquid crystal compound.

A second object of the present invention is to provide a liquid crystal display equipped with a polarizing plate having excellent characteristics as described above.

A third object of the present invention is to provide a polarizing plate which is improved in durability, and a liquid crystal display using the same.

The objects as described above is attained by the polarizing plate and the liquid crystal display having the following constitution.

(1) A polarizing plate comprising:
a polarizer;
an optical anisotropic layer containing a liquid crystal compound; and
a light-scattering layer containing a light-transmitting resin and a light-transmitting diffusing agent having a refractive index different from that of the light-transmitting resin, wherein the light-transmitting diffusing agent is dispersed in the light-transmitting resin.

(2) The polarizing plate as described in (1), wherein the light-scattering layer has an inner haze value (hi) due to inner diffusion of from 0 to 95.

(3) The polarizing plate as described in (2), wherein the light-scattering layer has an inner haze value (hi) due to inner diffusion of from 30 to 95.

(4) The polarizing plate as described in any one of (1) to (3), wherein the light-scattering layer has a surface haze value (hs) due to surface unevenness of more than 0.5 and less than 30.

(5) The polarizing plate as described in (4), wherein the sum of the surface haze value (hs) and the inner haze value (hi) of the light-scattering layer is 30 or more.

(6) The polarizing plate as described in any one of (1) to (5), wherein the light-scattering layer has the surface roughness Ra of the surface unevenness of 1.2 μm or less.

(7) The polarizing plate as described in any one of (1) to (6), wherein a difference in refractive index Δn between the light-transmitting resin and the light-transmitting diffusing agent in the light-scattering layer is from 0.01 to 0.8, and the light-transmitting diffusing agent has an average particle size (d) of from 0.1 to 5 μm.

(8) The polarizing plate as described in (7), wherein the light-transmitting diffusing agent is a light-transmitting fine particles, and the difference in the refractive index of the light-transmitting fine particles and that of the light-transmitting resin is from 0.02 to 0.15, and the light-transmitting fine particles have particle size distribution having at least two peaks, and the light-diffusing layer has the haze value (the sum of the surface haze value (hs) and the inner haze value (hi)) of 40% or more.

(9) The polarizing plate as describe in (8), wherein one peak of the particle size distribution of the light-transmitting fine particles is in the region of from 0.5 to 2.0 μm, and another one peak is in the region of from 2.5 to 5.0 μm.

(10) The polarizing plate as described in (8), which further comprises a low refractive index layer having a refractive index of from 1.35 to 1.45 provided on the light-diffusing layer.

(11) The polarizing plate as described in (10), wherein the low refractive index layer includes a hardened product of composition containing: a fluorine-containing compound capable of crosslinking by one of heat and ionizing radiation; and inorganic fine particles.

(12) The polarizing plate as described in any one of (1) to (11), wherein the liquid crystal compound is a discotic compound.

(13) The polarizing plate as described in any one of (1) to (12), wherein at least one cellulose acetate film is provided between the optical anisotropic layer and the polarizer and between the polarizer and the light-scattering layer, respectively.

(14) A liquid crystal display comprising the polarizing plate as described in any one of (1) to (13), wherein the optical anisotropic layer side of the polarizing plate described in any one of (1) to (13) is arranged on the liquid crystal cell side.

Further, in the present specification, the peak of particle size distribution means the maximum value in the distribution curve obtained by classifying fine particles by the particle size (0.1 μm unit) with the particle size as the axis of abscissa and the particle number as the axis of ordinate.

Figure 1:
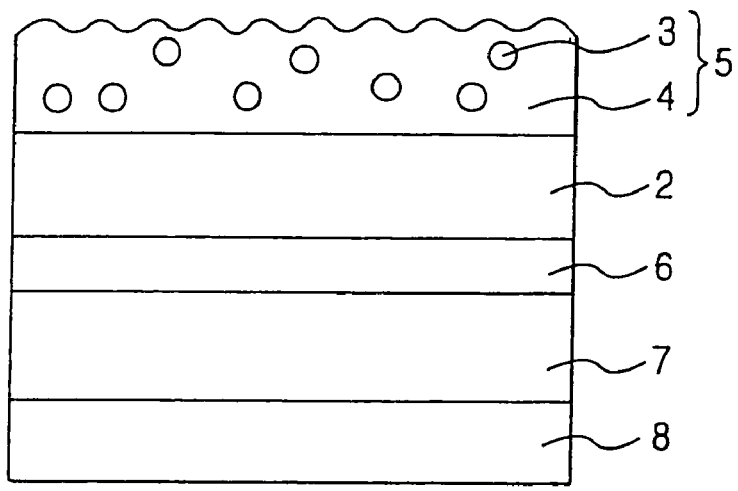
FIG. 1 shows the outline of the cross-sectional view of the preferred layer structure of the polarizing plate according to the present invention.

2: Transparent substrate film
3: Light-transmitting diffusing agent
4: Light-transmitting resin
6: Polarizer
7: Transparent substrate film
8: Optical anisotropic layer
10: Light-diffusing film
31: First light-transmitting fine particle
32: Second light-transmitting fine particle The present invention will be described in detail below.

The polarizing plate according to the present invention has a polarizer and an optical anisotropic layer comprising a liquid crystal compound as a constitutional layer. The polarizing plate further has a light-scattering layer comprising a light-transmitting resin having dispersed therein a light-transmitting diffusing agent having a refractive index different from that of the light-transmitting resin.

The outline of the cross-sectional view of the preferred layer structure of the polarizing plate in the present invention is shown in FIG. 1 below. Light-scattering layer 5 is laminated on one surface of transparent substrate film 2 (the upper side in the figure) and polarizer 6, transparent substrate film 7 and optical anisotropic layer 8 are laminated on the opposite surface of transparent substrate film 2 (the lower side in the figure). The layer structure of the polarizing plate according to the present invention is not limited to one shown in FIG. 1, and there are of course various variations.

The preferable light-scattering layer (also referred to as "the light-scattering film" that also includes a substrate) in the present invention will be described in detail below based on FIG. 2.

Figure 2:
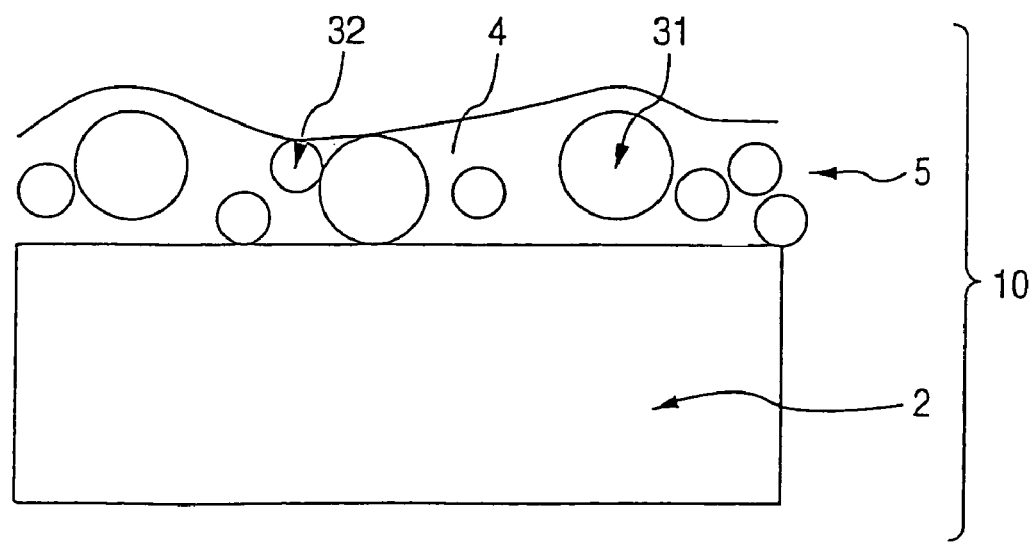
FIG. 2 shows the cross-sectional view of the light-scattering film according to the present invention.

As shown in FIG. 2, light-scattering film 10 according to the present invention comprises in lamination of transparent substrate film 2 and light-scattering layer 5 comprising light-transmitting resin 4 containing therein first light-transmitting fine particle 31 and second light-transmitting fine particle 32. The present invention is described by two kinds of transparent fine particles having two peaks in particle size distribution curve (the refractive indices are different), but the same kind of transparent fine particles having two peaks in particle size distribution curve (the refractive index is the same) may be used.

Each layer constituting the polarizing plate according to the present invention is described based on FIG. 1 below.

Light-Scattering Layer

Light-scattering layer 5 provided on the polarizing plate according to the present invention is a layer for scattering light and widening the downward angle of visibility of a liquid crystal display by combining with an optical anisotropic layer which is described later.

Light-scattering layer 5 is a so-called inner light-scattering layer comprising a light-transmitting resin having dispersed therein a light-transmitting diffusing agent having a refractive index different from that of the light-transmitting resin as described above. Refractive index of light-scattering layer 5 may be distributed in the layer so long as it has such constitution. Light-scattering layer 5 is disclosed, e.g., in JP-A-11-305010.

The method of using an inner light-scattering layer in the polarizing plate according to the present invention is specifically described below.

The inner haze value (hi) of light-scattering layer 5 is preferably from 0 to 95, by which the downward angle of visibility of a liquid crystal display can be removed and surface glare can be lowered. "Surface glare" is so-called scintillation, i.e., a phenomenon of the occurrence of a glistening light.

The lower the surface haze value (hs) of light-scattering layer 5, the smaller is the fuzz of the display, thus clear display can be obtained, but too small a haze value results in the generation of reflecting in and surface glare. While when the surface haze value (hs) is too high, the display becomes whitish (whitening, lowering of black density). The surface haze value (hs) is preferably 0.5 or more and less than 30, more preferably from 7 to 20, and most preferably from 7 to 15.

Further, even when the surface haze value (hs) is optimal, if the inner haze value (hi) is low, surface glare is liable to occur. In view of lowering surface glare, the inner haze value (hi) of light-scattering layer 5 is preferably from 30 to 95, more preferably from 35 to 90, still more preferably from 35 to 70, particularly preferably from 40 to 60.

In the polarizing plate according to the present invention, when the sum of the surface haze value (hs) of light-scattering layer 5 and the inner haze value (hi) is 30 or more, a further effect can be obtained in the light of surface glare inhibition.

It is preferred in the present invention that the sum of the haze value is from 40% to 90%, more preferably from 45% to 80%, and most preferably from 50% to 70%. The haze value in the present invention can be measured according to JIS-K-7105 with a measuring apparatus (HR-100, manufactured by Murakami Shikisai Gijutsu Kenkyusho).

As methods of increasing inner scattering haze, there are a method of increasing the concentration of particles having a particle size of from 0.5 to 2.0 μm, a method of increasing the layer thickness, and a method of increasing the refractive index of the particles.

A desired surface haze value (hs) can be generally obtained by providing appropriate unevenness on the surface of the resin layer by containing fine particles in light-scattering layer 5, and this is a preferred form.

Further, unevenness can also be formed on the surface of a light-scattering layer by coating a coating solution of a mixture comprising light-transmitting diffusing agent 3 and light-transmitting resin 4 on transparent substrate film 2, laminating an excipient film having minute surface unevenness having a surface roughness Ra of 1.2 μm on the above-formed coated layer so that the surface of the excipient film is in contact with the coated layer, and irradiating the coated layer with electron beams or ultraviolet rays through the excipient film when light-transmitting resin 4 is an electron beam- or ultraviolet ray-curable resin, while when light-transmitting resin 4 is a solvent-dry type resin, unevenness is also formed on the surface of a light-scattering layer by peeling the excipient film from cured light-scattering layer 5 after heating and drying, to thereby obtain a desired surface haze value (hs). That is, according to such a method, minute unevenness having a surface roughness Ra of 1.2 μm or less formed on the excipient film in advance is transferred to the surface of light-scattering layer 5.

For bringing the inner haze value (hi), the surface haze value (hs) and the sum of these values into the above ranges, it is preferred that a difference in refractive index Δn between light-transmitting resin 4 and light-transmitting diffusing agent 3 constituting light-scattering layer 5 is from 0.01 to 0.8, and the average particle size d of the light-transmitting diffusing agent is from 0.1 to 5 μm.

When the difference in refractive index Δn is less than 0.01, a great large amount of diffusing agent must be contained in the light-transmitting resin for exhibiting light diffusibility in light-scattering layer 5, as a result, the adhesion of light-scattering layer 5 to transparent substrate film 2 and coating aptitude are deteriorated. While when Δn is higher than 0.8, the content of light-transmitting diffusing agent 3 in light-transmitting resin 4 is small, thus light-scattering layer 5 having uniform and appropriate unevenness cannot be obtained, these are not preferred at all events.

When the average particle size d of light-transmitting diffusing agent 3 is less than 0.1 μm, the dispersion of light-transmitting diffusing agent 3 in light-transmitting resin 4 is difficult, causing agglomeration, thus light-scattering layer 5 having uniform and appropriate unevenness cannot be obtained, and so not preferred. When d is more than 5 μm, since the diffusion effect in light-scattering layer 5 decreases, an inner value lowers and surface glare is generated, further, curing and shrinkage of a resin increase during manufacturing process of light-transmitting resin 4 due to a thickened film thickness, which causes troubles of cracking and curling, thus not preferred.

As the method of bringing the inner haze value (hi), the surface haze value (hs) and the sum of these values into the above ranges, e.g., a method of adjusting the ratio of light-transmitting diffusing agent 3 to light-transmitting resin 4, i.e., filler (P)/binder (V), a method of adjusting the refractive indices of P and V, and a method of adjusting the kind of solvent, can be exemplified.

Plastic beads are preferably used as light-transmitting diffusing agent 3 to be contained in light-scattering layer 5 and, in particular, those having high transparency and capable of reaching the above-described refractive index difference between light-transmitting resin 4 are preferably used.

As the plastic beads, e.g., polymethyl methacrylate beads (a refractive index of 1.51), acryl-styrene copolymer beads (a refractive index of 1.55), melamine beads (a refractive index of 1.57), polycarbonate beads (a refractive index of 1.57), styrene beads (a refractive index of 1.60), crosslinked styrene beads (a refractive index of 1.61), polyvinyl chloride beads (a refractive index of 1.60), benzoguanamine-melamine-formaldehyde copolymer beads (a refractive index of 1.68) and the like are used.

The particle sizes of these plastic beads are arbitrarily selected from 0.1 to 5 μm. Of the above plastic beads, styrene beads are particularly preferably used.

In the present invention, the light-transmitting fine particles are preferably used as the light-transmitting diffusing agent.

In the preferable embodiment of the present invention, visual angle characteristics concerning the grade of display and the reflection of outer lights can be optimized independently by mixing two kinds of fine particles having different particle sizes as the light-transmitting diffusing agent, and subtle arrangement becomes possible by the mixing ratio of the light-transmitting fine particles, and various kinds of designs come to be easy rather than the case of using one kind of fine particles alone.

The preferable embodiment of the present invention is described in detail below with referring to the FIG. 2.

Light-transmitting fine particles 31 and 32 may be monodispersed organic fine particles or inorganic fine particles. The less the particle size dispersion, the less is the scattering characteristic dispersion, thus the design of the haze value is easy.

First light-transmitting fine particle 31 consists of a light-transmitting resin, e.g., crosslinked styrene beads (most frequent particle size: 1.3 μm, refractive index: 1.61) and second light-transmitting fine particle 32 consists of a light-transmitting resin, e.g., crosslinked styrene beads (most frequent particle size: 3.5 μm, refractive index: 1.61).

More sufficient light diffusion effect can be obtained when the difference in refractive index between light-transmitting fine particles 31, 32 and light-transmitting resin 4 is 0.02 or more. Further, when the difference in refractive index is 0.15 or less, whitening of the film at large due to too high a light diffusibility can be strikingly prevented. The difference in refractive index is more preferably from 0.03 to 0.13, still more preferably from 0.04 to 0.10.

One peak of the particle size distribution of light-transmitting fine particles is preferably in the range of from 0.5 to 2.0 μm, and another peak is preferably in the range of from 2.5 to 5.0 μm. Such a particle size distribution curve can be easily obtained by mixing two kinds of fine particles different in the most frequent particle sizes.

The distribution of the angles of the light-scattering suited to the present invention can be obtained by the peak in the range of from 0.5 to 2.0 μm (in FIG. 2, the most frequent particle size of light-transmitting fine particle 31). In the present invention, it is necessary to diffuse lights subjected to incidence to a certain degree for improving the grade of display (the improvement of downward angle of visibility), and the larger the diffusion effect, the larger is the improvement of the characteristics of the angle of visibility. However, for maintaining the brightness of the front in view of the grade of display, it is necessary to heighten the transmittance as far as possible. By making the peak of particle size 0.5 μm or more, rear scattering can be made small to thereby control the reduction of brightness. Further, by making the peak of particle size 2.0 μm or less, a great scattering effect can be obtained, and so visual angle characteristics can be improved. The peak is more preferably from 0.6 to 1.8 μm, and most preferably from 0.7 to 1.6 μm.

The scattering at surface suited to the present invention can be obtained by the peak in the range of from 2.5 to 5.0 μm (in FIG. 2, the most frequent particle size of light-transmitting fine particle 32). In the present invention, it is also important to prevent reflection of an outer light by proper surface scattering for improving the grade of display.

As described above, as the particle size of fine particles, the most frequent particle size is more important than the average particle size. The most frequent particle size means the particle size to which the most numerous fine particles are classified when fine particles are classified by the particle sizes. The particle size of the fine particles described in the following (including Examples) means the most frequent particle size.

The light-transmitting diffusing agent such as the plastic beads may be used in an amount of from 10 to 50 mass parts per 100 mass parts of the light-transmitting resin.

When light-transmitting diffusing agent 3 is added as the organic filler described above, since the organic filler is liable to precipitate in the resin before curing, an inorganic filler such as silica may be added for the purpose of preventing precipitation. The more the inorganic filler to be added, the more effective is the prevention of precipitation of the organic filler, but transparency is adversely affected. Accordingly, precipitation of light-transmitting diffusing agent 3 can be prevented by adding preferably an inorganic filler having a particle size of 0.5 μm or less to light-transmitting resin 4 in an amount not to impair the transparency, e.g., less than 0.1 mass %.

When an inorganic filler for preventing precipitation of an organic filler is not added, a coating solution is preferably well mixed to make uniform at coating on transparent substrate film 2 since the organic filler is precipitated at the bottom.

The refractive index of ionizing radiation curing resins is generally about 1.5, which is almost the same as that of glass. If the refractive index of the ionizing radiation curing resin to be used is low in comparison with the refractive index of light-transmitting diffusing agent 3, at least one of the polymers obtained by the copolymerization of the above binder polymer and a monomer having a high refractive index and metallic oxide ultra fine particles having a high refractive index, etc may be used in addition to the refractive index of light-transmitting resin 4.

The examples of monomers having a high refractive index include bis(4-methacryloylthiophenyl)sulfide, vinylnaphthalene, vinylphenyl sulfide, 4-methacryloxyphenyl-4'-methoxyphenyl thioether, etc.

It is preferred for the metallic oxide ultra fine particles having a high refractive index to contain fine particles having a particle size of 100 nm or less, preferably 50 nm or less, comprising at least one oxide selected from zirconium, titanium, aluminum, indium, zinc, tin and antimony. As the examples of the fine particles, $ZrO_2$, $TiO_2$, $Al_2O_3$, $In_2O_3$, $ZnO$, $SnO_2$, $Sb_2O_3$ and ITO. The fine particles having a high refractive index are preferably used, for example, $TiO_2$ (a refractive index: from 2.3 to 2.7), $Y_2O_3$ (a refractive index: 1.87), $La_2O_3$ (a refractive index of 1.95), $ZrO_2$ (a refractive index: 2.05), or $Al_2O_3$ (a refractive index: 1.63), in a degree which can retain the diffusibility of the film.

The addition amount of the metallic oxide ultra fine particles is preferably from 10 to 90 mass %, more preferably from 20 to 80 mass %, of the entire mass of the light-transmitting resin.

As light-transmitting resin 4 constituting light-scattering layer 5, three kinds of resins hardened by irradiation with an ultraviolet ray or an electron beam, i.e., an ionizing radiation curing resin, resins comprising the mixture of an ionizing radiation curing resin, a thermoplastic resin and a solvent, and a thermocuring resin are mainly used. The ionizing radiation curing resin, the ionizing radiation curing resin and the thermocuring resin are resin compositions containing monomers, oligomeric compounds or prepolymers before curing as the film-forming components.

As the film-forming components of the ionizing radiation curing resin, preferably those containing an acrylate-based functional group, e.g., an oligomer or a prepolymer of (meth)acrylate and the like of polyfunctional compound such as a relatively low molecular weight polyester resin, a polyether resin, an acrylate resin, an epoxy resin, a urethane resin, an alkyd resin, a spiro-acetal resin, a polybutadiene resin, a polythiol polyene resin, and a polyhydric alcohol; and as a reactive diluent, a monofunctional monomer and a polyfunctional monomer, such as ethyl(meth)acrylate, ethylhexyl(meth)acrylate, styrene, methylstyrene and N-vinylpyrrolidone, e.g., those containing a relatively large amount of polymethylolpropane tri(meth)acrylate, hexanediol(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate, can be used in the present invention.

Further, an ultraviolet ray-curing resin can be obtained by adding a photopolymerization initiator, e.g., acetophenones, benzophenones, Michler's benzoylbenzoate, á-amyloxime ester, tetramethylthiuram monosulfide, or thioxanthones, and a photosensitizer, e.g., n-butylamine, triethylamine, or poly-n-butylphospine, to the ionizing radiation curing resin.

In particular, in the present invention, it is preferred to mix urethane acrylate as the oligomer and dipentaerythritol hexa (meth)acrylate as the monomer.

The thickness of the light-scattering layer is generally from 0.5 to 50 μm or so, preferably from 1 to 20 μm, more preferably from 1.5 to 10 μm, and most preferably from 2 to 6 μm.

The light-transmitting resin has a refractive index of preferably from 1.50 to 2.00, more preferably from 1.51 to 1.80, and still more preferably from 1.61 to 1.70. The refractive index of the glare-shielding hard coat layer is a value measured by excluding the light-transmitting fine particles. When the refractive index is too small, a reflection preventing property lowers. While when the refractive index is too high, the tint of the reflected light of the polarizing plate of the present invention disadvantageously increases.

In place of or in addition to the monomers having two or more ethylenic unsaturated groups, crosslinking structure may be introduced into a binder by the reaction of a crosslinkable group. The examples of crosslinkable functional groups include an isocyanate group, an epoxy group, an aziridine group, an oxazoline group, an aldehyde group, a carbonyl group, a hydrazine group, a carboxyl group, a methylol group and an active methylene group. Vinylsulfonic acid, acid anhydride, cyanoacrylate derivative, melamine, etherified methylol, ester and urethane, and metal alkoxide such as tetrametoxysilane can be used as the monomers for introducing crosslinking structure. Functional groups which show a crosslinking property as a result of decomposition reaction, e.g., a blocked isocyanate group, may also be used, i.e., crosslinking functional groups which show reactivity as a result of decomposition may be used in the present invention even if they do not show reactivity in a moment.

The binders having these crosslinkable functional groups can form crosslinking structure by heating after coating.

Further, as light-transmitting resin 4 for forming light-scattering layer 5, a solvent-dry type resin may be contained in the ionizing radiation curing resin. Thermoplastic resins are mainly used as the solvent-dry type resin. The kind of the solvent-dry type thermoplastic resin to be added to the ionizing radiation curing resin is not particularly restricted, however, when cellulose-based resins, such as TAC and the like described later, are used as transparent substrate film 2, cellulose-based resins, e.g., nitrocellulose, acetylcellulose, cellulose acetate propionate, and ethylhydroxyethyl cellulose are advantageously used as the solvent-dry type thermoplastic resin to be added to the ionizing radiation curing resin in the point of adhesion and transparency of the film.

When the light-transmitting resin is in contact with the transparent substrate film, the solvents for the coating solution for forming the light-transmitting resin are comprised of one or more solvents which dissolve the cellulose triacetate support and one or more solvents which do not dissolve the cellulose triacetate support for contriving to reconcile the exhibition of glare-shielding property and the adhesion of the support with the light-scattering layer. More preferably, at least one of the solvents which do not dissolve the cellulose triacetate support has higher boiling point than the boiling point of at least one of the solvents which dissolve the cellulose triacetate support. Still more preferably, the temperature difference of the boiling point between the solvent having the highest boiling point of the solvents which do not dissolve the cellulose triacetate support and the solvent having the highest boiling point of the solvents which dissolve the cellulose triacetate support is 30° C. or more, and most preferably, the temperature difference is 50° C. or more.

As the solvents which dissolve a cellulose triacetate, the following solvents can be exemplified:

Ethers having from 3 to 12 carbon atoms, specifically, dibutyl ether, dimethoxymethane, dimethoxyethane, diethoxyethane, propylene oxide, 1,4-dioxane, 1,3-dioxolan, 1,3,5-trioxane, tetrahydrofuran, anisole, and phenetole;

Ketones having from 3 to 12 carbon atoms, specifically, acetone, methyl ethyl ketone, diethyl ketone, dipropyl ketone, diisobutyl ketone, cyclopentanone, cyclohexanone, methyl cyclohexanone, and methyl cyclohexanone;

Esters having from 3 to 12 carbon atoms, specifically, ethyl formate, propyl format, n-pentyl formate, methyl acetate, ethyl acetate, methyl propionate, ethyl propionate, n-pentyl acetate, and γ-butyrolactone;

Organic solvents having two or more functional groups, specifically, 2-methoxymethyl acetate, 2-ethoxymethyl acetate, 2-ethoxyethyl acetate, 2-ethoxyethyl propionate, 2-methoxyethanol, 2-propoxyethanol, 2-butoxyethanol, 1,2-diacetoxyacetone, acetylacetone, diacetone alcohol, methyl acetoacetate, and ethyl acetoacetate.

These solvents can be used alone or in combination of two or more.

As the solvents which do not dissolve cellulose triacetate, methanol, ethanol, 1-propanol, 2-propanol, 1-butanol, 2-butanol, tert-butanol, 1-pentanol, 2-methyl-2-butanol, cyclohexanol, isobutyl acetate, methyl isobutyl ketone, 2-octanone, 2-pentanone, 2-hexanone, 2-heptanone, 3-pentanone, 3-heptanone and 4-heptanone can be exemplified.

These solvents can be used alone or in combination of two or more.

The mass ratio of the total amount of the solvents which dissolve cellulose triacetate (A) to the total amount of the solvents which do not dissolve cellulose triacetate (B) (A/B) is preferably from 5/95 to 50/50, more preferably from 10/90 to 40/60, still more preferably from 15/85 to 30/70.

The reasons why using cellulose-based resins in the ionizing radiation curing resin is advantageous are that when toluene which is a preferred solvent is used for the cellulose-based resins, adhesion of transparent substrate film 2 and the film resin can be improved even when a coating solution containing the solvent-dry type resin is coated on transparent substrate film 2, although toluene which does not dissolve polyacetyl cellulose of transparent substrate film 2 is used, and further that since toluene does not dissolve polyacetyl cellulose of transparent substrate film 2, the surface of transparent substrate film 2 does not whiten, thus transparency is maintained.

Moreover, there is a further advantage of using the solvent-dry type resin in the ionizing radiation curing resin as follows.

When the ionizing radiation curing resin is coated on transparent substrate film 2 with a roll coater having a metalling roll, the liquid state resin film remained on the metalling roll surface flows and causes streak and unevenness with the lapse of time, and they re-transfer to the coated surface and result in the defects of streak and unevenness on the coated surface. However, when the solvent-dry type resin is contained in the ionizing radiation curing resin, such film defects on the coated surface can be prevented from occurring.

As the curing method of the ionizing radiation curing resin, ordinary curing methods of the ionizing radiation curing resin, e.g., methods by irradiation with electron beams or ultraviolet rays can be used.

Specifically, electron beams having several tens of KeV energy can be used, and in the case of curing by ultraviolet rays, ultraviolet rays emitted from the rays such as an extra high voltage mercury lamp, a high voltage mercury lamp, a low voltage mercury lamp, a carbon arc lamp, a xenon arc lamp, and a metal halide lamp can be used.

As the thermoplastic resins mixed into the ionizing radiation curing resin, a phenolic resin, a urea resin, a diallylphthalate resin, a melanin resin, a guanamine resin, an unsaturated polyester resin, a polyurethane resin, an epoxy resin, an aminoalkyd resin, a melamine-urea co-condensation resin, a silicone resin and a polysiloxane resin are used and, if necessary, a crosslinking agent, a curing agent such as a polymerization initiator, a polymerization accelerator, a solvent, and a viscosity adjusting agent are added.

As the material of transparent substrate film 2 on which light-scattering layer 5 is formed, a transparent resin film, a transparent resin plate, a transparent resin sheet and transparent glass can be exemplified.

The examples of transparent resin films which can be used in the present invention include a triacetate cellulose (TAC) film, a polyethylene terephthalate (PET) film, a diacetylcellulose film, an acetate butyrate cellulose film, a polyether sulfone film, a polyacrylic resin film, a polyurethane resin film, a polyester film, a polycarbonate film, a polysulfone film, polyether film, a polymethylpentene film, a polyether ketone film and a (meth)acrylonitrile film. The thickness of the transparent resin film is generally from 25 to 1,000 μm or so.

When the polarizing plate according to the present invention is applied to a liquid crystal display, TAC which does not have double refraction is particularly preferably used as transparent substrate film 2, since TAC makes it possible to laminate a light-scattering film and a polarizer element (described later), and an excellent liquid crystal display can be obtained by the light-scattering film.

The light-scattering layer was described above.

The substrate for the light-scattering layer and the low refractive index layer on the light-scattering layer will be described in detail below.

Transparent Substrate Film

As the material of transparent substrate film 12, a transparent resin film, a transparent resin plate, a transparent resin sheet and transparent glass can be exemplified. The examples of transparent resin films which can be used in the present invention include a cellulose triacetate (TAC) film, a polyethylene terephthalate (PET) film, a diacetylene cellulose film, an acetate butyrate cellulose film, a polyether sulfone film, a polyacrylic resin film, a polyurethane resin film, a polyester film, a polycarbonate film, a polysulfone film, a polyether film, a polymethylpentene film, a polyether ketone film and a (meth)acrylonitrile film. The thickness of the transparent resin film is generally from 25 to 1,000 μm or so.

Since the transparent substrate film in the present invention is used at the outermost surface of a polarizing plate, a cellulose acetate film which is generally used as the protective film of a polarizing plate is preferably used as the transparent substrate film.

A cellulose acetate film which is highly transparent, has surface smoothness, and particularly preferably used as the transparent substrate film of the light-scattering film is described below.

Highly Transparent and High Smooth Cellulose Acetate Film

A cellulose acetate film having a degree of acetylation of from 59.0 to 61.5% is used in the present invention.

A degree of acetylation means the amount of bound acetic acid per a cellulose unit mass. The measurement and computation of a degree of acetylation is performed according to ASTM D-817-91 (a test method of cellulose acetate).

The viscosity average polymerization degree (DP) of cellulose ester is preferably 250 or more, more preferably 290 or more.

Cellulose acetate for use in the present invention preferably has narrow molecular weight distribution of Mw/Mn (Mw is a mass average molecular weight, and Mn is a number average molecular weight) by gel permeation chromatography. The specific Mw/Mn value is preferably from 1.0 to 1.7, more preferably from 1.3 to 1.65, and most preferably from 1.4 to 1.6.

In general, not hydroxyl groups at the 2-, 3- and 6-positions of cellulose acylate are divided uniformly by ⅓ of the substitution degree at large, but the substitution degree of the hydroxyl group at the 6-position is liable to be small. Cellulose acylate of the substitution degree of the hydroxyl groups higher at the 6-position than at the 2- and 3-positions is preferably used in the present invention.

Thirty-two percent or more of the hydroxyl group at the 6-position is preferably substituted with acyl group, more preferably 33% or more, and particularly preferably 34% or more, based on the entire substitution degree. Further, the substitution degree of the cellulose acylate with acyl group at the 6-position is preferably 0.88 or more.

The hydroxyl group at the 6-position may be substituted with an acyl group having 3 or more carbon atoms, e.g., a propionyl group, a butyroyl group, a valeroyl group, a benzoyl group or an acryloyl group. The substitution degree at each position can be measured by NMR.

The cellulose acetates synthesized by the methods disclosed in Example and Synthesis Example 1, paragraphs [0043] and [0044], Synthesis Example 2, paragraphs [0048] and [0049], and Synthesis Example 3, paragraphs [0051] and [0052] in JP-A-11-5851 can be used as the cellulose acylates in the present invention.

Production of Cellulose Acetate Film

The cellulose acetate film is preferably produced by solvent casting. In a solvent casting method, a film is produced by using a solution (a dope) comprising an organic solvent having dissolved therein a cellulose acetate.

It is preferred that the organic solvent includes a solvent selected from an ether having from 3 to 12 carbon atoms, a ketone having from 3 to 12 carbon atoms, an ester having from 3 to 12 carbon atoms, and a hydrocarbon halide having from 1 to 6 carbon atoms.

The ether, ketone and ester may have a cyclic structure. Compounds having any two or more functional groups of the ether, ketone and ester (i.e., —O—, —CO— and —COO—) can also be used as the organic solvents. The organic solvents may have other functional groups, such as an alcoholic hydroxyl group. When the organic solvents have two or more functional groups, the number of carbon atoms is sufficient within the defined range of the compound having any of the functional groups.

The examples of ethers having from 3 to 12 carbon atoms include diisopropyl ether, dimethoxymethane, dimethoxyethane, 1,4-dioxane, 1,3-dioxolan, tetrahydrofuran, anisole and phenetole.

The examples of ketones having from 3 to 12 carbon atoms include acetone, methyl ethyl ketone, diethyl ketone, diisobutyl ketone, cyclohexanone and methylcyclohexanone.

The examples of esters having from 3 to 12 carbon atoms include ethyl formate, propyl formate, pentyl formate, methyl acetate, ethyl acetate and pentyl acetate.

The examples of organic solvents having two or more functional groups include 2-ethoxyethyl acetate, 2-methoxyethanol and 2-butoxyethanol.

The number of carbon atoms of the hydrocarbon halide is preferably 1 or 2, most preferably 1. The halogen of the hydrocarbon halide is preferably chlorine. When the hydrogen atom of the hydrocarbon halide is substituted with a halogen is preferably from 25 to 75 mol %, more preferably from 30 to 70 mol %, still more preferably from 35 to 65 mol %, and most preferably from 40 to 60 mol %. Methylene chloride is a representative hydrocarbon halide.

Two or more organic solvents may be used in combination.

A cellulose acetate solution can be prepared according to an ordinary method. An ordinary method means processing at temperature of 0° C. or higher (room temperature or high temperature). The production of a cellulose acetate solution can be performed using the method and apparatus of the production of a dope in an ordinary solvent casting method. Further, in the case of using an ordinary method, it is preferred to use hydrocarbon halide (in particular, methylene chloride) as the organic solvent.

The amount of cellulose acetate is adjusted so that the cellulose acetate is contained in the solution obtained in an amount of from 10 to 40 mass %. The content of the cellulose acetate is more preferably from 10 to 30 mass %. Arbitrary additives as described later may be contained in advance in the organic solvent (a main solvent).

A cellulose acetate solution can be prepared by stirring cellulose acetate and an organic solvent at ordinary temperature (from 0 to 40° C.). A solution having high concentration may be stirred under pressure and heating. Specifically, cellulose acetate and an organic solvent are put into a pressure vessel and closed, and stirred with heating at a temperature higher than a boiling point at room temperature of the solvent under pressure but within the range of not boiling. Heating temperature is generally 40° C. or more, preferably from 60 to 200° C., and more preferably from 80 to 110° C.

Each component may be roughly mixed before being put in a vessel, or may be put in a vessel in sequence. It is necessary that the vessel is constituted so as to be able to perform stirring. Pressure can be applied to the vessel by putting an inert gas, e.g., a nitrogen gas. Rising steam pressure due to heating of the solvent can be utilized. Alternatively, each component may be added under pressure after closing the vessel.

Heating is preferably performed from the outside of the vessel. For example, a jacket type heating apparatus can be used. Further, the vessel at large can be heated by providing a plate heater outside the vessel and circulating the solution through the piping.

It is preferred that the solution is stirred with stirring blades provided inside the vessel. The stirring blades preferably have lengths reaching near the wall of the vessel. It is preferred to provide scraping blades at the ends of the stirring blades for renewing the liquid film on the wall of the vessel.

Measuring instruments, such as a pressure gauge and a thermometer, may be provided on the vessel. Each component is dissolved in a solvent in the vessel. The prepared dope is taken out of the vessel after being cooled or taken out and then cooled using a heat exchanger.

A cellulose acetate solution can also be prepared by a cooling dissolution method. Cellulose acetate can be dissolved by a cooling dissolution method in an organic solvent which is difficult to dissolve cellulose acetate by an ordinary dissolution method. Further, when a solvent which can dissolve cellulose acetate even by an ordinary dissolution method is used in a cooling dissolution method, a uniform solution can be rapidly obtained.

In a cooling dissolution method, in the first place, cellulose acetate is gradually added to an organic solvent at room temperature with stirring.

The amount of cellulose acetate is preferably adjusted to be contained in the mixture in an amount of from 10 to 40 mass %. The content of cellulose acetate is more preferably from 10 to 30 mass %. Further, arbitrary additives as described later may be contained in advance in the mixture.

In the next place, the mixture is cooled to from −100 to −10° C., preferably from −80 to −10° C., more preferably from −50 to −20° C., and most preferably from −50 to −30° C. Cooling can be effected, e.g., in a dry ice-methanol bath (−75° C.) and a cooled diethylene glycol solution (from −30 to −20° C.). The mixture of the cellulose acetate and the organic solvent is solidified by cooling in such a way.

A cooling speed is preferably 4° C./min or more, more preferably 8° C./min or more, and most preferably 12° C./min or more. The cooling speed is preferably the faster, but the theoretical upper limit is 10,000° C./sec, the technical upper limit is 1,000° C./sec, and the practical upper limit is 100° C./sec. The cooling speed is a value obtained by dividing the difference between the temperature before beginning cooling and the final cooling temperature by the time required to reach the final cooling temperature from the initiation of cooling.

In the next place, the cooled solution is heated to 0 to 200° C., preferably from 0 to 150° C., more preferably from 0 to 120° C., and most preferably from 0 to 50° C., thus cellulose acetate is dissolved in the organic solvent. Temperature up may be effected by allowing the mixture in room temperature or may be heated in a warm bath.

A heating speed is preferably 4° C./min or more, more preferably 8° C./min or more, and most preferably 12° C./min or more. The heating speed is preferably the faster, but the theoretical upper limit is 10,000° C./sec, the technical upper limit is 1,000° C./sec, and the practical upper limit is 100° C./sec. The heating speed is a value obtained by dividing the difference between the temperature before beginning heating and the final heating temperature by the time required to reach the final heating temperature from the initiation of heating.

A uniform solution can be obtained by the method as described above. If dissolution is insufficient, operations of cooling and heating may be repeated. Whether dissolution is sufficient or not can be judged only by visually observing the external appearance of the solution.

In a cooling dissolution method, it is preferred to use a closed vessel for preventing inclusion of moisture content due to moisture condensation. In cooling and heating operations, pressure application during cooling and pressure reduction during heating result in the reduction of time required for dissolution. For performing pressure application and pressure reduction, it is desired to use a pressure-tight vessel.

It has been confirmed by differential scanning calorimetry (DSC) that the 20 mass % solution obtained by dissolving cellulose acetate (a degree of acetylation: 60.9%, viscosity average polymerization degree: 299) in methyl acetate by a cooling dissolution method has a pseudo phase transition point of a solid state and a gel state near 33° C., and the solution becomes a uniform gel state under this temperature. Accordingly, it is necessary to maintain the temperature of the solution at higher than the pseudo phase transition temperature, preferably at gel phase transition temperature plus 10° C. or so. However, this pseudo phase transition temperature varies depending upon the degree of acetylation and the viscosity average polymerization degree of cellulose acetate, the concentration of a solution and an organic solvent to be used.

A cellulose acetate film is formed from the prepared cellulose acetate solution (dope) by solvent casting.

A film is formed by casting a dope on a drum or a band and evaporating a solvent. It is preferred to adjust the concentration of the dope before casting to a solid content of from 18 to 35%. The surface of the drum or the band is preferably finished like a mirror surface. The methods of casting and drying in the solvent casting method are disclosed in U.S. Pat. Nos. 2,336,310, 2,367,603, 2,492,078, 2,492,977, 2,492,978, 2,607,704, 2,739,069, 2,739,070, British Patents 640,731, 736,892, JP-B-45-4554 (the term "JP-B" as used herein means an "examined Japanese patent publication"), JP-B-49-5614, JP-A-60-176834, JP-A-60-203430 and JP-A-62-115035.

It is preferred to cast a dope on a drum or a band of the surface temperature of 10° C. or less. It is preferred to dry the cast dope by applying wind for 2 seconds or more. The formed film may be peeled from the drum or the band and may further be dried by applying high temperature wind varying from 100 to 160° C. in succession to evaporate a remaining solvent. This method is disclosed in JP-B-5-17844. According to these methods, the time required from casting until peeling off can be reduced. For performing this method, it is necessary that the dope should gel by the surface temperature of the drum or the band at casting.

Film-forming can be effected by casting of two layers or more using the prepared cellulose acylate solution (dope). In this case, it is preferred to prepare a cellulose acylate film by a solvent casting method. A film is formed by casting a dope on a drum or a band and evaporating a solvent. It is preferred to adjust the concentration of the dope before casting to a solid content of from 10 to 40%. The surface of the drum or the band is preferably finished like a mirror surface.

When a plurality of cellulose acylate solutions of two or more layers are cast, a film may be prepared by casting solutions containing cellulose acylate from a plurality of casting mouths provided in the moving direction of a support with intervals and laminating the solutions and, e.g., the methods disclosed in JP-A-61-158414, JP-A-1-122419 and JP-A-11-198285 can be applied to the present invention. Film-forming can also be effected by casting cellulose acylate solutions from two casting mouths and the methods disclosed in JP-B-60-27562, JP-A-61-94724, JP-A-61-947245, JP-A-61-104813, JP-A-61-158413 and JP-A-6-134933 can be used in the present invention. Moreover, a cellulose acylate film casting method of enveloping the flow of a high viscosity cellulose acylate solution with a low viscosity cellulose acylate solution and extruding high viscosity and low viscosity cellulose acylate solutions at the same time, as disclosed in JP-A-56-162617, may be used.

Alternatively, as is disclosed in JP-B-44-20235, a film may be formed using two casting mouths by a method of peeling off a film formed on a support by the first casting mouth, and casting a solution from the second casting mouth on the side of the film touched the support.

Cellulose acylate solutions which are cast may be the same or different, and they are not particularly restricted. To give respective functions to a plurality of cellulose acylate layers, it is sufficient to cast each cellulose acylate solution suited to each function from each casting mouth.

Cellulose acylate solutions can be cast to form different functional layers (e.g., an adhesion layer, a dye layer, an antistatic layer, an antihalation layer, a UV ray-absorbing layer, a polarizing layer, etc.) can be cast at the same time.

With conventional single layer solution, it is necessary to extrude a high concentration and high viscosity cellulose acylate solution to form a desired film thickness, thus various problems arise, such that the stability of a cellulose acylate solution is poor and solid matters are generated, defects due to lumps or flatness failure are caused. For solving these problems, by casting a plurality of cellulose acylate solutions from casting mouths, not only highly viscous solutions can be extruded on the support at the same time, as a result, a plane property is improved and films having excellent flatness can be produced, but also dry loading can be reduced by using high concentration solutions, thus the production speed of films can be increased.

A plasticizer can be added to cellulose acetate films for the purpose of improving mechanical properties and drying velocity. As the plasticizer, phosphoric ester and carboxylic ester are used. The examples of phosphoric esters include triphenyl phosphate (TPP) and tricresyl phosphate (TCP). As carboxylic esters, phthalic ester and citric ester are representative. The examples of phthalic esters include dimethyl phthalate (DMP), diethyl phthalate (DEP), dibutyl phthalate (DBP), dioctyl phthalate (DOP), diphenyl phthalate (DPP) and diethylhexyl phthalate (DEHP). The examples of citric esters include O-acetyl citric acid triethyl (OACTE) and O-acetyl citric acid tributyl (OACTB). The examples of other carboxylic esters include butyl oleate, methylacetyl ricinoleate, dibutyl sebacate, and a variety of trimellitic esters. Phthalic ester-based plasticizers (e.g., DMP, DEP, DBP, DOP, DPP, DEHP) are preferably used. DEP and DPP are particularly preferred.

The addition amount of plasticizers is preferably from 0.1 to 25 mass % of the amount of the cellulose ester, more preferably from 1 to 20 mass %, and most preferably from 3 to 15 mass %.

Degradation-preventing agents (e.g., an antioxidant, a peroxide-decomposing agent, a radical inhibitor, a metal-inactivating agent, an acid catcher, amine) may be added to cellulose acetate films. Degradation-preventing agents are disclosed in JP-A-3-199201, JP-A-5-1907073, JP-A-5-194789, JP-A-5-271471 and JP-A-6-107854. The addition amount of degradation-preventing agents is preferably from 0.01 to 1 mass % of the solution (dope) to be prepared, more preferably 0.01 to 0.2 mass %. When the addition amount is less than 0.01 mass %, the effect of the addition of degradation-preventing agents is hardly observed. When the addition amount is more than 1 mass %, bleeding out of the degradation-preventing agents to the surface of films sometimes occurs. Particularly preferred degradation-preventing agents are butylated hydroxytoluene (BHT) and tribenzylamine (TBA).

Surface Treatment of Cellulose Acetate Film

It is preferred for a cellulose acetate film to be subjected to surface treatment. As the specific examples of surface treatments, corona discharge treatment, glow discharge treatment, flame treatment, acid treatment, alkali treatment and ultraviolet ray irradiation treatment can be exemplified. It is also preferred to provide an undercoating layer as disclosed in JP-A-7-333433.

From the viewpoint of retaining the surface property of a film, it is preferred to make the temperature of a cellulose acetate film lower than the Tg, specifically 150° C. or less.

When a cellulose acetate film is used as the transparent protective film of a polarizing plate, it is particularly preferred to perform acid treatment or alkali treatment, i.e., saponification treatment of the cellulose acetate film, from the point of adhesion with a polarizing film.

The surface energy is preferably 55 mN/m or more, more preferably from 60 to 75 mN/m.

The surface treatment will be specifically described below taking alkali saponification treatment as an example. It is preferred to perform the treatment according to the cycle of immersing the film surface in an alkali solution, neutralizing with an acid solution, washing and drying.

As the alkali solution, a potassium hydroxide solution and a sodium hydroxide solution can be exemplified, and the normality of the hydroxide ion is preferably from 0.1 to 3.0N, more preferably from 0.5 to 2.0N. The temperature of the alkali solution is preferably from room temperature to 90° C., more preferably from 40 to 70° C.

From the viewpoint of productivity, after an alkali solution is coated and saponification treatment is performed, it is preferred to remove alkali from the surface of the film by washing with water. In the light of wettability, alcohols are preferably used as the coating solvent, e.g., IPA, n-butanol, methanol and ethanol, and as the assistant of alkali dissolution, it is preferred to add water, propylene glycol and ethylene glycol to the solvent.

The surface energy of a solid can be found according to contact angle process, wetting heat process and adsorption process as described in *Nure no Kiso to Oyo* (*The Elements and Applications of Wetting*), Realize Co. (Dec. 10, 1989). In the case of the cellulose acetate film according to the present invention, it is preferred to use contact angle process.

Specifically, two kinds of solutions whose surface energies are already known are dripped on a cellulose acetate film, at the intersection of the surface of the droplet and the surface of the film, the angle formed by the tangent line drawn on the droplet and the surface of the film and containing the droplet is defined as the contact angle, and the surface energy of the film can be obtained by computation.

Low Refractive Index Layer

A low refractive index layer is provided as the reflection preventing layer as the outermost layer on the side of the support on which, if necessary, the hard coat layer is provided for the purpose of giving a reflection preventing property to polarizing plate of the present invention.

The refractive index of the low refractive index layer is preferably from 1.35 to 1.45.

It is preferred that the refractive index of the low refractive index layer should satisfy the following equation (I):

$$(m\lambda/4) \times 0.7 < n_1 d_1 < (m\lambda/4) \times 1.3 \quad (I)$$

wherein m represents a positive odd number (generally 1), $n_1$ represents the refractive index of the low refractive index layer, and $d_1$ represents the layer thickness of the low refractive index layer (nm). $\lambda$ represents the wavelength of the visible ray, which is the value in the range of from 450 to 650 nm.

Satisfying the above equation (I) means that m (a positive odd number, generally 1) which satisfies equation (I) in the above wavelength range is present.

A cured fluorine-containing resin of a heat curing type or ionizing radiation curing type crosslinkable fluorine-containing compound is preferably used in the low refractive index layer. The friction coefficient of a cured fluorine-containing resin is preferably from 0.03 to 0.15, and the contact angle to water is preferably from 90 to 120°.

As the crosslinkable fluorine-containing compound, silane compounds containing a perfluoroalkyl group, e.g., (heptadecafluoro-1,1,2,2-tetradecyl)triethoxysilane, and fluorine-containing copolymers containing a fluorine-containing monomer and a monomer for providing a crosslinking property as constitutional units can be exemplified.

The specific examples of the fluorine-containing monomer units include, e.g., fluoroolefins (e.g., fluoroethylene, vinylidene fluoride, tetrafluoroethylene, hexafluoroethylene, hexafluoropropylene, perfluoro-2,2-dimethyl-1,3-dioxole, etc.), partially or completely fluorinated alkyl ester derivatives of (meth)acrylic acid (e.g., Biscote 6FM (manufactured by Osaka Yuki Kagaku Co., Ltd.), M-2020 (manufactured by Daikin Kogyo Co., Ltd.)), and completely or partially fluorinated vinyl ethers, etc.

As the monomers for providing a crosslinking property, (meth)acrylate monomers having a crosslinkable functional group in advance in the molecule, e.g., glycidyl methacrylate, (meth)acrylate monomers having a carboxyl group, a hydroxyl group, an amino group or a sulfonic acid group (e.g., (meth)acrylic acid, methylol (meth)acrylate, hydroxyalkyl (meth)acrylate, allyl acrylate, etc.) can be exemplified. In the latter case, crosslinking structure can be introduced after copolymerization as disclosed in JP-A-10-25388 and JP-A-10-147739.

Not only the above-described copolymers of a fluorine-containing monomer and a monomer for providing a crosslinking property but the polymers of these copolymers copolymerized with other monomers may be used in the low refractive index layer.

Other monomers which may be copolymerized are not particularly restricted and, e.g., olefins (e.g., ethylene, propylene, isoprene, vinyl chloride, vinylidene chloride), acrylic esters (e.g., methyl acrylate, methyl acrylate, ethyl acrylate, 2-ethylhexyl acrylate), methacrylic esters (e.g., methyl methacrylate, ethyl methacrylate, butyl methacrylate, ethylene glycol dimethacrylate), styrene derivatives (e.g., styrene, divinylbenzene, vinyltoluene, α-methylstyrene), vinyl ethers (e.g., methyl vinyl ether), vinyl esters (e.g., vinyl acetate, vinyl propionate, vinyl cinnamate), acrylamides (e.g., N-tert-butylacrylamide, N-cyclohexylacrylamide), methacrylamides and acrylonitrile derivatives can be exemplified.

For giving a scratch resisting property, it is preferred that the ultra fine particles of an Si oxide having an average particle size of preferably 0.1 μm or less, more preferably from 0.001 to 0.05 μm, be added to the fluorine-containing resins for use in the low refractive index layer. In view of the prevention of reflection, the refractive index is preferably the lower, but as the refractive index of the fluorine-containing resin is lowered, the scratch resistance is deteriorated. Accordingly, the best balanced point of scratch resistance and low refractive index can be found by optimizing the refractive index of the fluorine-containing resin and the addition amount of the ultra fine particles of an Si oxide.

As the ultra fine particles of an Si oxide, silica sols dispersed in commercially available organic solvents may be directly added to the coating solution or various kinds of commercially available silica powders may be used by being dispersed in organic solvents.

The average mirror reflectivity at incidence of 5° of the light-diffusing film in the wavelength range of from 450 to 650 nm is preferably 2.5% or less.

The mirror reflectivity at incidence of 5° is the rate of the strength of the reflected light at −5 in the normal direction to the incident light at +5° in the normal direction of the sample, which becomes the criterion of the reflecting in of a background by the mirror reflection. When the mirror reflectivity at incidence of 5° is applied to a glare-shielding reflection-preventing film, the strength of the reflected light at −5° in the normal direction becomes weak for the scattered light attributing to the surface unevenness provided for the purpose of giving a glare-shielding property. Hence, the mirror reflectivity is a measuring method reflecting the contribution of both of a glare-shielding property and a reflection preventing property.

When the average mirror reflectivity at incidence of 5° of the light-diffusing film in the wavelength range of from 450 to 650 nm is more than 2.5%, the reflecting in of a background is annoying and the visibility lowers when applied to the front film of a display.

In the next place, the optical anisotropic layer which constitutes the polarizing plate according to the present invention is described below.

Optical Anisotropic layer

Liquid Crystal Compound

The liquid crystal compounds which are used in the present invention may be rod-like liquid crystals or discotic liquid crystals, and they may be high molecular weight liquid crystals or low molecular weight liquid crystals, or low molecular weight liquid crystals which are crosslinked and do not show liquid crystal property are also included.

As rod-like liquid crystals, azomethines, azoxys, cyanobiphenyls, cyanophenyl esters, benzoic esters, cyclohexanecarboxylic acid phenyl esters, cyanophenyl cyclohexanes, cyano-substituted phenylpyrimidines, alkoxy-substituted phenylpyrimidines, phenyldioxanes, tolans, and alkenylcyclohexyl benzonitriles are preferably used. Metal complexes are also included in rod-like liquid crystals. Liquid crystal polymers containing rod-like crystalline molecules in the repeating units can also be used as rod-like liquid crystals. In other words, rod-like liquid crystals may be bonded to (liquid crystal) polymers.

Rod-like liquid crystals are described in the Japan Chemical Society compiled, *Kikan Kagaku Sosetsu-Ekisho no Kagaku (Quaterly Publication, The Elements of Chemistry—Chemistry of Liquid Crystals)*, Chaps. 4, 7 and 11, Vol. 22 (1994), the Japan Society for the Promotion of Science, 142Committee compiled, *Ekisho Device Handbook (Liquid Crystal Device Handbook)*, Chap. 3, and JP-A-2000-304932.

As the examples of the discotic liquid crystals, the benzene derivatives described in the research report by C. Destrade et al., *Mol. Cryst.*, Vol. 71, p. 111 (1981), the truxene derivatives described in the research reports by C. Destrade et al., *Mol. Cryst.*, Vol. 122, p. 141 (1985), and *Physics Lett. A.*, Vol. 78, p. 82 (1990), the cyclohexane derivatives described in the research report by B. Kohne et al., *Angew. Chem.*, Vol. 96, p. 70 (1984), and aza-crown-based and phenylacetylene-based macrocycles described in the research report by J. M. Lehn et al., *J. Chem. Commun.*, p. 1794 (1985), and the research report by J. Zhang et al., *J. Am. Chem. Soc.*, Vol. 116, p. 2655 (1994) can be exemplified.

The discotic liquid crystals generally have the structure with these compounds as the mother nuclei of the molecular center, and with straight chain alkyl groups, alkoxyl groups, or substituted benzoyloxy groups substituted radially as the straight chains and show a liquid crystalline property. However, the discotic liquid crystals are not limited to the above description so long as the molecules themselves have a negative uniaxial property and definite orientation can be given to them.

Further, "liquid crystal compound" of the optical anisotropic layer comprising a liquid crystal compound does not need to be liquid crystalline in the optical anisotropic layer constituting the polarizing plate in the present invention. For example, the low molecular weight discotic liquid crystal may have a group reactive with heat and light, result in polymerization or crosslinking by reaction with heat and light to be polymerized to lose the liquid crystalline property, to thereby form an optical anisotropic layer.

The preferred examples of discotic liquid crystals are disclosed in JP-A-8-50206.

The optical anisotropic layer constituting the polarizing plate in the present invention is preferably a layer comprising a compound having a discotic structure and having a negative refractive index, and it is preferred that the plane of the discotic structure inclines toward the transparent support, and the angle formed by the plane of the discotic structure and the plane of the transparent support varies in the depth direction of the optical anisotropic layer.

The angle of the plane of the discotic structure (angle of inclination) generally increases or decreases in the depth direction of the optical anisotropic layer and with the increment of the distance from the bottom of the optical anisotropic layer. It is preferred for the angle of inclination to increase with the increment of the distance. Further, the variations of the angle of inclination include continuous increment, continuous decrement, intermittent increment, intermittent decrement, variation including continuous increment and continuous decrement, and intermittent variation including increment and decrement. Intermittent variation includes the area where the angle of inclination does not vary midway along the depth direction. It is preferred that the angle of inclination should be increasing or decreasing as a whole even if the area of not varying is included, and continuous variation is particularly preferred.

The optical anisotropic layer is generally obtained by coating a solution comprising a discotic compound and other compounds having dissolved in a solvent on an oriented film, drying the coated film, heating it to the temperature of forming a discotic nematic phase, and then cooling with maintaining the state of orientation (the discotic nematic phase). Alternatively, the optical anisotropic layer can be obtained by coating on an oriented film a solution comprising a discotic compound and other compounds (e.g., a polymerizable monomer or a photopolymerization initiator) having dissolved in a solvent, drying the coated film, heating to the temperature of forming a discoticnematic phase, polymerizing (e.g., by irradiation with UV rays and the like), and then cooling. The transition temperature from discotic nematic liquid crystal phase to solid phase of the discotic liquid crystal compounds for use in the present invention is preferably from 70 to 300° C., and particularly preferably from 70 to 170° C.

The inclination angle of the discotic structure on the side of transparent substrate film 7 of the optical anisotropic layer can be adjusted generally by selecting the discotic compound or the material of orientation film, or selecting the method of rubbing treatment. The inclination angle of the discotic structure of the opposite side (air side) can be adjusted by selecting the discotic compound or other compounds to be used together with the discotic compound (e.g., plasticizers, surfactants, polymerizable monomers and polymers). Further, the degree of inclination can also be adjusted by the above selection.

The thickness of the optical anisotropic layer can be adjusted by a lip flow rate and line speed, or stretching and compression in film-forming. Since moisture permeability varies depending upon the materials to be used, it is possible to optimize moisture permeability by adjusting the thickness in a preferred range.

The free volume of the optical anisotropic layer can be adjusted by drying temperature and time in film-forming. Since moisture permeability varies depending upon the materials to be used, it is possible to optimize moisture permeability by adjusting the free volume in a preferred range.

The hydrophilic/hydrophobic properties of the optical anisotropic layer can be adjusted by adding additives. Moisture permeability can be increased by adding a hydrophilic additive to the free volume, contrary to this, moisture permeability can be reduced by adding a hydrophobic additive.

It becomes possible to manufacture a polarizing plate having an optical compensating function inexpensively and in high productivity by controlling the moisture permeability.

The optical anisotropic layer may be referred to JP-A-7-191217, JP-A-8-50202, EP 0911656A2, and so on.

Transparent Support for Coating Optical Anisotropic Layer Comprising Liquid Crystal Discotic Compound The transparent support is not particularly restricted as long as it is a plastic film having high transmittance, but it is preferred to use cellulose acetate which is a protective film of the polarizing plate.

Since the transparent support on which the optical anisotropic layer is coated plays an optically important role in itself, it is preferred to adjust the Re retardation value of the transparent support to 0 to 200 nm and the Rth retardation value from 70 to 400 nm.

When two sheets of optically anisotropic cellulose acetate films are used in a liquid crystal display, the Rth retardation value of the films is preferably from 70 to 250 nm.

When one sheet of optically anisotropic cellulose acetate film is used in a liquid crystal display, the Rth retardation value of the film is preferably from 150 to 400 nm.

The double refractive indices of the cellulose acetate film ($\Delta n: n_x-n_y$) are preferably from 0.00 to 0.002, and the double refractive indices of the cellulose acetate film in the thickness direction $[(n_x+n_y)/2-n_z]$ are preferably from 0.001 to 0.04.

Retardation value (Re) is computed according to the following equation:

$$Re=(n_x-n_y)\times d$$

wherein $n_x$ represents the refractive index in the lagging axis direction of the in-plane of the phase contrast plate (the maximum refractive index in the in-plane); and $n_y$ represents the refractive index in the vertical direction to the lagging axis of the in-plane of the phase contrast plate.

$$Rth=[(n_x+n_y)/2-n_z]\times d \qquad (II)$$

Equation (II) is an equation for obtaining the refractive index in the lagging axis direction (the direction where the refractive index is maximum) of the in-plane of the film.

In equation (II), $n_y$ represents the refractive index in the leading axis direction (the direction where the refractive index is minimum) of the in-plane of the film.

In formula (II), $n_z$ represents the refractive index in the thickness direction of the film.

In formula (II), d represents the thickness of the film (nm unit).

Polarizer

In the next place, a polarizer which constitutes the polarizing plate according to the present invention is described below.

As the polarizer, an iodine-based polarizing film, a dye-based polarizing film using a dichromatic dye, and a polyene-based polarizing film can be exemplified. An iodine-based polarizing film and a dye-based polarizing film can be generally produced using a polyvinyl alcohol-based film.

Other Layers Constituting Polarizing Plate

Two sheets of transparent protective films can be provided on both sides of the polarizer of a polarizing plate. One of these protective films can serve as the cellulose acetate film preferably used as transparent substrate film 7 present between the polarizer and the optical anisotropic layer as described above, and the other protective film can serve as the cellulose acetate film preferably used as transparent substrate film 2 present between the polarizer and the light-scattering layer.

The lagging axis of the cellulose acetate film which is a protective film and the transmitting axis of the polarizer are arranged so as to be substantially parallel to each other.

The moisture permeability of the protective films is important for the productivity of the polarizing plate. This is because the polarizer and the protective films are adhered by a water-based adhesive, and the adhesive is dried by the diffusion in the protective films. The higher the moisture permeability of the protective films, the faster is drying, thus the productivity is improved. However, if the moisture permeability is too high, the moisture content enters into the polarizing film, and so the polarizing performance lowers depending upon the use condition of the liquid crystal display (under high humidity).

The moisture permeability of the protective film is determined by the thickness, the free volume and the hydrophilic/hydrophobic properties of the polymer film (and the polymerizable liquid crystal compound).

The moisture permeability of the protective film of the polarizing plate is preferably from 100 to 1,000 g/m$^2$·24 hrs, more preferably from 300 to 700 g/m$^2$·24 hrs.

The thickness of the protective film can be adjusted by a lip flow rate and line speed, or stretching and compression in film-forming. Since moisture permeability varies depending upon the materials to be used, it is possible to optimize moisture permeability by adjusting the thickness in a preferred range.

The free volume of the protective film can be adjusted by drying temperature and time in film-forming. Since moisture permeability varies depending upon the materials to be used, it is possible to optimize moisture permeability by adjusting the free volume in a preferred range.

The hydrophilic/hydrophobic properties of the protective film can be adjusted by adding additives. Moisture permeability can be increased by adding a hydrophilic additive to the free volume, contrary to this, moisture permeability can be reduced by adding a hydrophobic additive.

In the present invention, an orientation film may be provided on the substrate. The orientation film is a film comprised of a rubbing-treated crosslinked polymer.

Orientation Film

The orientation film is a layer comprising two kinds of crosslinked polymers. At least one polymer itself may be a crosslinkable polymer or may be a polymer crosslinked by a crosslinking agent. The orientation film can be formed by causing reaction among polymers having functional groups, or polymers to which functional groups have been introduced, with light, heat or pH change; or introducing bonding groups derived from crosslinking agent into polymers to cause a crosslinking reaction among the polymers using compounds having high reaction activity.

Crosslinking process is generally performed by coating a coating solution containing the polymer or the mixture of the polymer and a crosslinking agent on a transparent support and then heating the coated layer. However, since it is sufficient to ensure durability at the final stage of the product, crosslinking may be performed at any stage after coating the coating solution of an orientation film on a transparent support before obtaining a final optical compensating sheet. Taking account of the orienting performance of the compound having a disc-like structure (an optical anisotropic layer) formed on the orientation film, it is also preferred to perform sufficient crosslinking after the orientation of the compound having a disc-like structure. That is, when a coating solution containing the polymer and a crosslinking agent capable of crosslinking the polymer is coated on a transparent support, after heating and drying the coated layer (generally crosslinking proceeds after this heating, but if the temperature is not sufficiently high, crosslinking further proceeds when the coated layer is heated at a temperature higher than the temperature of forming a discoticnematic phase), rubbing treatment is performed to form an orientation film, subsequently, a coating solution containing the compound having a disc-like structural unit is coated on the orientation film, and then the coated layer is heated at a temperature higher than the temperature of forming a discotic nematic phase, followed by cooling the heated layer, thereby an optical anisotropic layer is formed.

As the polymers for use in the orientation film, any of a polymer capable of crosslinking in itself and a polymer which is crosslinked by virtue of a crosslinking agent can be used. There are, of cource, polymers unite both of the above functions. The examples of the polymers include polymers, e.g., polymethyl methacrylate, acrylic acid/methacrylic acid copolymer, styrene-maleinimide copolymer, polyvinyl alcohol and modified polyvinyl alcohol, poly(N-methylolacrylamide), styrene-vinyltoluene copolymer, chlorosulfonated polyethylene, nitrocellulose, polyvinyl chloride, chlorinated polyolefin, polyester, polyimide, vinyl acetate-vinyl chloride copolymer, ethylene-vinyl acetate copolymer, carboxymethyl cellulose, polyethylene, polypropylene and polycarbonate, and compounds, e.g., a silane coupling agent. The preferred polymers are water-soluble polymers, such as poly(N-methylolacrylamide), carboxymethyl cellulose, gelatin, polyvinyl alcohol and modified polyvinyl alcohol, the more preferred are gelatin, polyvinyl alcohol and modified polyvinyl alcohol, and the particularly preferred are polyvinyl alcohol and modified polyvinyl alcohol.

Of the above polymers, polyvinyl alcohol and modified polyvinyl alcohol are preferred, and it is most preferred to use two kinds of polyvinyl alcohol or modified polyvinyl alcohol each having a different degree of polymerization in combination.

Polyvinyl alcohols have a saponification degree of from 70 to 100%, preferably from 80 to 100%, and more preferably from 85 to 95%. The polymerization degree is preferably from 100 to 3,000. As modified polyvinyl alcohols, polyvinyl alcohols modified by copolymerization (as the modifying groups, e.g., COONa, $Si(OX)_3$, $N(CH_3)_3 \cdot Cl$, $C_9H_{19}COO$, $SO_3$, Na and $C_{12}H_{25}$ are introduced), polyvinyl alcohols modified by chain transfer (as the modifying groups, e.g., COONa, SH and $C_{12}H_{25}$ are introduced), and polyvinyl alcohols modified by block polymerization (as the modifying groups, e.g., COOH, $CONH_2$, COOR, and $C_6H_5$ are introduced), can be exemplified. Of these compounds, unmodified or modified polyvinyl alcohols having a saponification degree of from 80 to 100% are preferred, and unmodified polyvinyl alcohols or alkylthio-modified polyvinyl alcohols having a saponification degree of from 85 to 95% are more preferred.

Synthesis methods, measurement of visible ray absorption spectrum and determining methods of the introduction rate y are disclosed in detail in JP-A-8-338913.

As the specific examples of the crosslinking agents which are used with polymers, such as the above polyvinyl alcohols, the following compounds can be exemplified and these compounds are particularly preferred when used in combination with the above water-soluble polymers, in particular, polyvinyl alcohols and modified polyvinyl alcohols (including the above specific modified products). For example, aldehydes (e.g., formaldehyde, glyoxal and glutaraldehyde), N-methylol compounds (e.g., dimethylolurea and methyloldimethylhydantoin), dioxane derivatives (e.g., 2,3-dihydroxydioxane), compounds which exhibit the function by activating a carboxyl group (e.g., carbenium, 2-naphthalenesulfonate, 1,1-bis-pyrrolidino-1-chloropyridinium, and 1-morpholinocarbonyl-3-(sulfonatoaminomethyl)), active vinyl compounds (e.g., 1,3,5-triacryloyl-hexahydro-s-triazine, bis(vinylsulfone)methane, and N,N'-methylenebis[β-(vinylsulfonyl)propionamide]), active halogen compounds (e.g., 2,4-dichloro-6-hydroxy-s-triazine), isooxazoles, and dialdehyde starches can be exemplified. These compounds may be used alone or in combination. In view of the productivity, aldehydes having high reaction activity, in particular, glutaraldehyde is preferably used.

Crosslinking agents are not particularly restricted, and the more the addition amount, the more is the improvement of the moisture proof. However, since the orientation performance as the orientation film lowers when the addition amount is 50 mass % or more based on the polymer, the amount is preferably from 0.1 to 20 mass %, particularly preferably from 0.5 to 15 mass %. The orientation film according to the present invention contains a certain amount of an unreacted crosslinking agent even after the crosslinking reaction has finished, and the remaining amount of the crosslinking agent is preferably 1.0 mass % or less in the orientation film, especially preferably 0.5 mass % or less. If the crosslinking agent is contained in the orientation film in an amount of more than 1.0 mass %, sufficient durability cannot be obtained. That is, when the orientation film is used in a liquid crystal display, there is a case where reticulation occurs due to the use for a long time or leaving under high temperature high humidity conditions for a long period of time.

The orientation film can be formed fundamentally by coating a coating solution containing orientation film-forming materials, i.e., the polymer and the crosslinking agent, on a transparent support, heating and drying the coated layer (crosslinking), and performing rubbing treatment. As described above, the crosslinking reaction may be performed at arbitrary stage after coating of the solution on a transparent support. When a water-soluble polymer, such as the above polyvinyl alcohol, is used as the orientation film-forming material, the coating solution is preferably a mixed solvent comprising an organic solvent having a defoaming function, e.g., methanol, with water. The mixing ratio of water to methanol is generally from 0/100 to 99/1, preferably from 0/100 to 91/9, in the mass ratio. The generation of foams can be prevented by the use of the above mixed solvent, and the defects on the layer surface of the orientation film, further, the optical anisotropic layer, are conspicuously reduced. As the coating methods, a spin coating method, a dip coating method, a curtain coating method, an extrusion coating method, a bar coating method, and an E-type coating method can be used. An E-type coating method is especially preferred. The layer thickness is preferably from 0.1 to 10 μm. Drying by heating can be performed at 20 to 110° C. For effecting sufficient crosslinking, the temperature is preferably from 60 to 100° C., particularly preferably from 80 to 100° C. The drying time is from 1 minute to 36 hours, preferably from 5 to 30 minutes. It is preferred to make the pH value optimal for the crosslinking agent to be used. When glutaraldehyde is used, pH is preferably from 4.5 to 5.5, particularly preferably 5.

The orientation film is provided on a transparent support or the above-described undercoating layer. The orientation film can be obtained, as described above, by the rubbing treatment of the surface after crosslinking the polymer layer. The orientation film functions to prescribe the orientation of the liquid crystal discotic compound provided on the orientation film.

Widely used treating method in the liquid crystal orientation process of LCD can be used for the rubbing treatment, i.e., a method of rubbing the surface of the orientation film in the definite direction with paper, gauge, felt, rubber, or nylon or polyester fabric. In general, rubbing is performed by rubbing the surface of the layer several times with cloth planted with fibers having uniform length and diameter uniformly.

Liquid Crystal Display

The polarizing plate according to the present invention is preferably used in a liquid crystal display, in particular, a transmission type liquid crystal display.

The transmission type liquid crystal display comprises a liquid crystal cell and two polarizing plates arranged on both sides of the liquid crystal cell. The liquid crystal cell carries liquid crystal between two electrode substrates.

It is preferred to arrange the optical anisotropic layer of the polarizing plate according to the present invention on the liquid crystal cell side.

The liquid crystal cell comes in various modes.

In the liquid crystal cell of an STN mode, rod-like liquid crystal molecules are substantially horizontally oriented when electric voltage is not applied and further torsionally oriented at 180° to 270°. Further, in the liquid crystal cell of a TN mode, rod-like liquid crystal molecules are substantially horizontally oriented when electric voltage is not applied and further torsionally oriented at 60° to 120°.

The liquid crystal cells of an STN mode and a TN mode are most widely used as black-and-white and color liquid crystal displays, and described in a variety of literature.

In the liquid crystal cell of a VA mode, rod-like liquid crystal molecules are substantially vertically oriented when electric voltage is not applied.

In the liquid crystal cell of a VA mode, (1) the liquid crystal cell of a VA mode in a narrow sense of orienting rod-like liquid crystal molecules substantially vertically when electric voltage is not applied and substantially horizontally when electric voltage is applied (JP-A-2-176625), (2) the liquid crystal cell of a VA mode having multi-domains (an MVA mode) for widening the field of view (SID97, described in *Digest of Tech. Papers* (*preliminary*), 28, (1997), 845), (3) the liquid crystal cell of a mode of orienting rod-like liquid crystal molecules substantially vertically when electric voltage is not applied and orienting torsionally in multi-domains when electric voltage is applied (an n-ASM mode) (described in Papers of Discussion of Liquid Crystal Society, Japan (preliminary), pp. 58-59 (1998)), and (4) SURVAIVAL mode liquid crystal cell (came out on LCD International 98) are included.

The liquid crystal cell of an OCB mode is a liquid crystal display using the liquid crystal cell of a bend orientation mode of orienting rod-like liquid crystal molecules in substantially reverse directions (symmetrically) at the upper part and the lower part of the liquid crystal cell, and they are disclosed in U.S. Pat. Nos. 4,583,825 and 5,410,422. Since the rod-like liquid crystal molecules are oriented symmetrically at the upper part and the lower part of the liquid crystal cell, the liquid crystal cell of a bend orientation mode has a self optical compensating function. Therefore, this liquid crystal mode is called an OCB (Optically Compensatory Bend) liquid crystal mode. The liquid crystal display of a bend orientation mode has an advantage that the speed of response is rapid.

EXAMPLE

The present invention is explained in further detail with reference to the following examples, however, these examples should not be construed as limiting the scope of the present invention.

Example 1

Preparation of Cellulose Acetate Solution

The following components were put into a mixing tank, and stirred with heating to dissolve each component, thereby a cellulose acetate solution was prepared.

Composition of Cellulose Acetate Solution

| | |
|---|---|
| Cellulose acetate of degree of acetylation of 60.9% | 100 mass parts |
| Triphenylphosphate (plasticizer) | 7.8 mass parts |
| Biphenyldiphenylphosphate (plasticizer) | 3.9 mass parts |
| Methylene chloride (first solvent) | 300 mass parts |
| Methanol (second solvent) | 54 mass parts |
| 1-Butanol (third solvent) | 11 mass parts |

A retardation increasing agent (Sumisolv TM165-F, manufactured by Sumitomo Chemical Co., Ltd.) (16 mass parts), 80 mass parts of methylene chloride and 20 mass parts of methanol were put into another mixing tank and stirred with heating, thereby a solution of retardation increasing agent was prepared.

The above-prepared retardation increasing agent (25 mass parts) was added to 475 mass parts of the cellulose acetate solution and stirred thoroughly to prepare a dope. The addition amount of the retardation increasing agent was 3.0 mass parts per 100 mass parts of cellulose acetate.

Re retardation value and Rth retardation value at wavelength of 633 nm of the above-prepared cellulose acetate film (CAF-01) were measured with an ellipsometer (M-150, manufactured by Nippon Bunko Co., Ltd.). Re value was 10 nm and Rth value was 81 nm.

Preparation of Cellulose Acetate Solution

The following components were put into a mixing tank, and stirred with heating to dissolve each component, thereby a cellulose acetate solution was prepared.

| | |
|---|---|
| Cellulose triacetate (powder having degree of substitution: 2.82, viscosity average polymerization degree: 320, water content: 0.4 mass %, viscosity of 6 mass % in a methylene chloride solution: 305 mPa·s, average particle size: 1.5 mm, standard deviation: 0.5 mm) | 20 mass parts |
| Methyl acetate | 58 mass parts |
| Acetone | 5 mass parts |
| Methanol | 5 mass parts |
| Ethanol | 5 mass parts |
| Butanol | 5 mass parts |
| Plasticizer A (ditrimethylolpropane-tetraacetate) | 1.2 mass parts |
| Plasticizer B (triphenyl phosphate) | 1.2 mass parts |
| UV agent a [2,4-bis(n-octylthio)-6-(4-hydroxy-3,5-di-tert-butylanilino)-1,3,5-triazine] | 0.2 mass parts |
| UV agent b [2-(2'-hydroxy-3',5'-di-tert-butylphenyl)-5-chlorobenzotriazole] | 0.2 mass parts |
| UV agent c [2-(2'-hydroxy-3',5'-di-tert-amylphenyl)-5-chlorobenzotriazole] | 0.2 mass parts |
| $C_{12}H_{25}OCH_2CH_2O-P(=O)-(OK)_2$ (a peeling agent) | 0.02 mass parts |
| Citric acid (a peeling agent) | 0.02 mass parts |
| Fine particles (silica, particle size: 20 nm, Mohs's hardness: about 7) | 0.05 mass parts |

The cellulose triacetate used here had a residual amount of acetic acid of 0.01 mass % or less, Ca of 0.05 mass %, Mg of 0.007 mass %, and Fe was 5 ppm. The acetyl group at the 6-position was 0.95, which was 32.2% of the entire acetyl. The extracted content by acetone was 11 mass %, the ratio of mass average molecular weight to number average molecular weight was 0.5, and the distribution was uniform. The yellow index was 0.3, a haze value was 0.08, the transparency was 93.5%, Tg was 160° C., and crystallization exothermic value was 6.2 J/g.

A retardation increasing agent (Sumisolv TM165-F, manufactured by Sumitomo Chemical Co., Ltd.) (16 mass parts), 80 mass parts of methylene chloride and 20 mass parts of methanol were put into another mixing tank and stirred with heating, thereby a solution of retardation increasing agent was prepared.

The above-prepared retardation increasing agent (25 mass parts) was added to 475 mass parts of the cellulose acetate solution and stirred thoroughly to prepare a dope. The addition amount of the retardation increasing agent was 3.0 mass parts per 100 mass parts of cellulose acetate.

Re retardation value and Rth retardation value at wavelength of 633 nm of the above-prepared cellulose acetate film (CAF-02) were measured with an ellipsometer (M-150, manufactured by Nippon Bunko Co., Ltd.). Re value was 10 nm and Rth value was 81 nm.

Preparation of Undercoating Layer

A coating solution having the composition shown below was coated on the above-prepared cellulose acetate film (CAF-01) in a coating amount of 28 ml/m², and the coated layer was dried, thereby an undercoating layer having a thickness of 0.1 μm was obtained.

| | |
|---|---|
| Gelatin | 0.542 mass parts |
| Formaldehyde | 0.136 mass parts |
| Salicylic acid | 0.160 mass parts |
| Acetone | 39.1 mass parts |
| Methanol | 15.8 mass parts |
| Methylene chloride | 40.6 mass parts |
| Water | 1.2 mass parts |

Further, a coating solution having the composition shown below was coated thereon in a coating amount of 7 ml/m².

| | |
|---|---|
| Anionic copolymer shown below x/y/z = 50/25/25) | 0.079 mass parts |
| Citric acid monoethyl ester | 1.01 mass parts |
| Acetone | 20 mass parts |
| Methanol | 87.7 mass parts |
| Water | 4.05 mass parts |

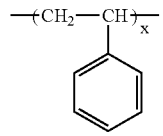

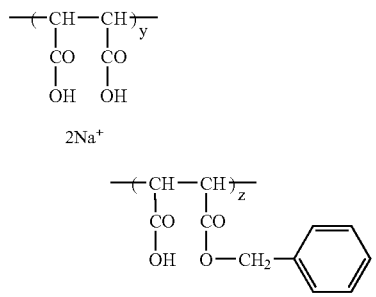

2Na⁺

A coating solution having the composition shown below was coated in a coating amount of 25 ml/m² on the opposite side of the cellulose acetate film on which the undercoating layer was coated, prepare a backing layer was prepared.

Composition of Backing Layer Coating Solution

| | |
|---|---|
| Cellulose diacetate (acetylation degree: 55%) | 0.656 mass parts |
| Silica-based matting agent (average particle size: 1 μm) | 0.065 mass parts |
| Acetone | 67.9 mass parts |
| Methanol | 10.4 mass parts |

Preparation of Orientation Layer

A coating solution having the composition shown below was coated on the gelatin layer of the cellulose acetate film (CAF-01) with a #16 wire bar coater in a coating amount of 28 ml/m². The coated layer was dried with a hot air of 60° C. for 60 seconds, further, at 90° C. for 150 seconds.

The formed layer was then subjected to rubbing treatment in the machine direction of the cellulose acetate film (CAF-01)

Composition of Coating Solution of Orientation Layer

| | |
|---|---|
| Modified polyvinyl alcohol having the structure shown below | 8 mass parts |
| PVA 217 (manufactured by Kurare Co., Ltd.) | 2 mass parts |
| Water | 371 mass parts |
| Methanol | 119 mass parts |
| Glutaraldehyde (crosslinking agent) | 9.5 mass parts |

Modified Polyvinyl Alcohol

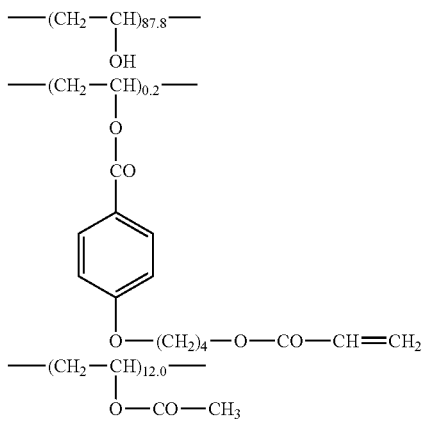

Formation of Optical Anisotropic Layer

A coating solution was prepared by dissolving 41.09 g of a discotic compound having the structure shown below, 2.03 g of ethylene oxide-modified trimethylolpropane triacrylate (V #360, manufactured by Osaka Yuki Kagaku Co., Ltd.), 2.03 g of dipentaerythritol acrylate (KYARAD DPHA, manufactured by Nippon Kayaku Co., Ltd.), 0.90 g of cellulose acetate butyrate (CAB551-0.2, manufactured by Eastman Chemical Japan Ltd.), 0.23 g of cellulose acetate butyrate (CAB531-1, manufactured by Eastman Chemical Japan Ltd.), 1.35 g of a photo-polymerization initiator (IRGACURE® 907, manufactured by Ciba Geigy Japan Limited), and 0.45 g of as ensitizer (Kaya Cure DETX, manufactured by Nippon Kayaku Co., Ltd.) in 102 g of methyl ethyl ketone. The above coating solution was coated on the orientation layer with a #4 wire bar coater. The cellulose acetate film was stuck on a metal frame and dried at 130° C. for 2 minutes in a constant temperature bath, thereby the discotic compound was oriented. The discotic compound was then polymerized under 80° C. atmosphere at layer temperature of about 100° C. by UV irradiation with a high pressure mercury lamp of intensity of 120 W/cm for 0.4 seconds, and then the film was allowed to be cooled to room temperature. Thus, an optical anisotropic layer was formed.

Re retardation value measured at wavelength of 633 nm of the optical anisotropic layer was 48 nm. The angle (angle of inclination) between the plane of the disc and the plane of the first transparent support was 42° on average.

Discotic Liquid Crystal Compound

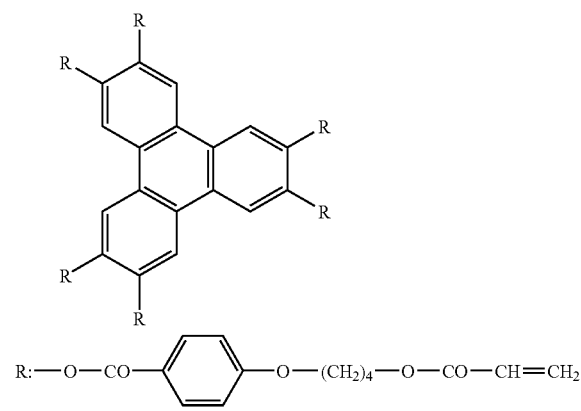

R:—O—CO—〈benzene ring〉—O—(CH$_2$)$_4$—O—CO—CH=CH$_2$

Preparation of Polarizing Plate (Pol-A)

Iodine was adsorbed onto a stretched polyvinyl alcohol film to prepare a polarizing film, and the cellulose acetate film side of the above-prepared optical anisotropic layer comprising a liquid crystal compound was stuck on one side of the polarizing film with a polyvinyl alcohol-based adhesive, and a commercially available cellulose triacetate film (Fuji Tack TD80UF, manufactured by Fuji Photo Film Co., Ltd.), the side of which to be stuck was subjected to saponification treatment, was stuck on the other side of the polarizing film, and the polarizing film was dried at 80° C. for 10 minutes.

The transmitting axis of the polarizing film and the lagging axis of the optical anisotropic layer prepared above were arranged so as to be parallel to each other. The transmitting axis of the polarizing film and the lagging axis of the commercially available cellulose triacetate film were arranged so as to cross orthogonally.

A polarizing plate (Pol-A) was thus prepared.

Preparation of Polarizing Plate (Pol-B)

The coating solution of a light-scattering layer B was prepared as follows.

Composition of Coating Solution Of Light-Scattering Layer B

| | |
|---|---|
| PETA (trade name PET 30, manufactured by Nippon Kayaku Co., Ltd.) | 3.04 g |
| Styrene beads paste (trade name SX-130, manufactured by Soken Kagaku Co., Ltd.) | 1 g |
| 10% CAP (diluted with ethyl acetate) | 3.64 g |
| Solvent (toluene, butyl acetate, isobutyl alcohol) | 7.21 g |
| Photo-curing initiator (trade name acetic acid IRGACURE ® 651, manufactured by Ciba Geigy Japan Limited) | 0.11 g |
| P/V ratio | 10/100 |

Here, PETA is a pentaerythritol triacrylate, CAP is cellulose acetate propionate, and 10% CAP means that cellulose acetate propionate is diluted with ethyl acetate and the content of the polymer is 10%.

DPHA is dipentaerythritol hexaacrylate, and the solvent MIBK for diluting DPHA shows methyl isobutyl ketone.

P/V means the mass ratio of filler/binder, styrene beads paste (trade name SX-130) means the paste comprising styrene beads and PETA in proportion of 4/6, and the content of the beads is 40 mass %. The inner haze value hi was 7 and the surface haze value hs was 19, the average particle size of the beads was 3 μm, and the refractive index of the light-transmitting resin was 1.57.

The above coating solution of a light-scattering layer B was coated on the cellulose triacetate (TD80UF) side of the polarizing plate Pol-A, dried at 60° C. for 1 minute, and irradiated with 90 mJ of UV ray to be half-set, thus a light-scattering layer B having a layer thickness of 3 to 4 μm/m$^2$ was formed. The surface roughness Ra of the surface unevenness of the light-scattering layer B was 1.0 μm.

A polarizing plate (Pol-B) was thus prepared.

Preparation of Polarizing Plate (Pol-C)

The coating solution of a light-scattering layer C was prepared as follows.

Composition of Coating Solution of Light-Scattering Layer C

| | |
|---|---|
| PETA (trade name PET 30, manufactured by Nippon Kayaku Co., Ltd.) | 1.10 g |
| Styrene beads paste (trade name SX-130, manufactured by Soken Kagaku Co., Ltd.) | 2 g |
| 10% CAP (diluted with ethyl acetate) | 3.64 g |
| Solvent (toluene, butyl acetate, isobutyl alcohol) | 7.21 g |
| Photo-curing initiator (trade name IRGACURE ® 651, manufactured by Ciba Geigy Japan Limited) | 0.11 g |
| P/V ratio | 30/100 |

The inner haze value hi was 40 and the surface haze value hs was 13, the average particle size of the beads was 3 μm, and the refractive index of the light-transmitting resin was 1.57.

A polarizing plate (Pol-C) was prepared in the same manner as the preparation of (Pol-B) except that the light-scattering layer C was used in place of light-scattering layer B. The surface roughness Ra of the surface unevenness of the light-scattering layer C was 1.0 μm.

Example 2

Liquid crystal displays B and C according to the present invention were prepared by peeling off a pair of polarizing plates provided in the liquid crystal display (6E-A3, manufactured by Sharp Corporation) using a TN type liquid crystal cell and, in place of them, the above polarizing plate Pol-B or Pol-C was stuck on the side of a viewer with an adhesive, and the polarizing plate Pol-A on the back light side so that the optical anisotropic layer side faces the liquid crystal cell side, one sheet on each side. The transmitting axis of the polarizing plate on the viewer's side and the transmitting axis of the polarizing plate on the back light side were arranged so as to become O mode.

A liquid crystal display A for comparison was prepared in the same manner as above by peeling off a pair of polarizing plates provided in the liquid crystal display (6E-A3, manufactured by Sharp Corporation) using a TN type liquid crystal cell and, in place of them, the above polarizing plate Pol-A prepared in Example 1 was stuck on the viewer's side and on the back light side with an adhesive one sheet on each side. The transmitting axis of the polarizing plate on the viewer's side and the transmitting axis of the polarizing plate on the back light side were arranged so as to become O mode.

The angle of visibility of each of the prepared liquid crystal displays A, B and C was measured in eight stages of from black display (L1) to white display (L8) with a measuring apparatus (EZ-Contrast 160D, manufactured by ELDIM Co.). The results obtained are shown in Table 1 below.

TABLE 1

| Liquid Crystal Display | Angle of Visibility (the range where contrast ratio is 10 or more and there is no reverse of gradation of the black side) | | | |
|---|---|---|---|---|
| | Upper Part | Lower Part | Left Side | Right Side |
| A (Comparison) | 80° | 45° | 80° | 80° |
| B (Invention) | 80° | 55° | 80° | 80° |
| C (Invention) | 80° | 60° | 80° | 80° |

Note:
Reverse of gradation of the black side: Reverse between L1 and L2

As is apparent from the results shown in Table 1, the liquid crystal display in the present invention are widened in the angle of visibility, in particular, the downward angle of visibility.

Example 3

As the light-transmitting resin constituting a light-scattering layer, 100 mass parts of a UV ray-curing type resin (DPHA manufactured by Nippon Kayaku Co., Ltd., refractive index: 1.51), 5 mass parts of a curing initiator (Irgacure 184, manufactured by Ciba Geigy Japan Limited), 17 mass parts of crosslinked styrene beads (particle size: 1.3 μm, refractive index: 1.61, manufactured by Soken Kagaku Co., Ltd.) as first light-transmitting fine particles, and 7 mass parts of crosslinked styrene beads (particle size: 3.5 μm, refractive index: 1.61, manufactured by Soken Kagaku Co., Ltd.) as second light-transmitting fine particles were mixed and dissolved in methyl ethyl ketone/methyl isobutyl ketone (3/7 by mass ratio) so as to reach the solid content of 24%. The thus-prepared coating solution was coated on a cellulose triacetate film (TD-80U, manufactured by Fuji Photo Film Co., Ltd.) in a dry layer thickness of 6.0 μm, and after the solvent was dried, the coated layer was cured by irradiation with UV rays using an air cooled metal halide lamp (manufactured by Eye Graphics Co., Ltd.) of 160 W/cm at illumination intensity of 400 mW/cm², and the quantity of radiation of 300 mJ/cm², thereby a light-scattering film (HKF-01) was prepared.

The haze value (the sum of the surface haze value (hs) and the inner haze value (hi), mere "haze" means the sum of the surface haze value (hs) and the inner haze value (hi)) of HKF-01 measured according to JIS-K-7105 with a measuring apparatus (HR-100, manufactured by Murakami Shikisai Gijutsu Kenkyusho) was 67%, which was appropriate haze.

Example 4

As the light-transmitting resin constituting a light-scattering layer, 100 mass parts of a UV ray-curing type resin (DPHA manufactured by Nippon Kayaku Co., Ltd., refractive index: 1.51), 5 mass parts of a curing initiator (Irgacure 184, manufactured by Ciba Geigy Japan Limited), 34 mass parts of crosslinked styrene beads (particle size: 1.3 μm, refractive index: 1.61, manufactured by Soken Kagaku Co., Ltd.) as first light-transmitting fine particles, and 9 mass parts of crosslinked styrene beads (particle size: 3.5 μm, refractive index: 1.61, manufactured by Soken Kagaku Co., Ltd.) as second light-transmitting fine particles were mixed and dissolved in methyl ethyl ketone/methyl isobutyl ketone (3/7 by mass ratio) so as to reach the solid content of 52 mass %. The thus-prepared coating solution was coated on a cellulose triacetate film (TD-80U, manufactured by Fuji Photo Film Co., Ltd.) in a dry layer thickness of 3.5 μm, and after the solvent was dried, the coated layer was cured by irradiation with UV rays using an air cooled metal halide lamp (manufactured by Eye Graphics Co., Ltd.) of 160 W/cm at illumination intensity of 400 mW/cm² and the quantity of radiation of 300 mJ/cm², thereby a light-scattering film (HKF-02) was prepared.

The haze value of HKF-02 measured according to JIS-K-7105 with a measuring apparatus (HR-100, manufactured by Murakami Shikisai Gijutsu Kenkyusho) was 48%, which was appropriate haze.

Example 5

As the light-transmitting resin constituting a light-diffusing layer, 100 mass parts of a UV ray-curing type resin (DPHA manufactured by Nippon Kayaku Co., Ltd., refractive index: 1.51), 3 mass parts of a curing initiator (Irgacure 907, manufactured by Ciba Geigy Japan Limited), and 11 mass parts of crosslinked styrene beads (particle size: 1.3 μm, refractive index: 1.61, manufactured by Soken Kagaku Co., Ltd.) as light-transmitting fine particles were mixed and dissolved in methyl ethyl ketone/cyclohexanone (6/4 by mass ratio) so as to reach the solid content of 11 mass %. The thus-prepared coating solution was coated on a cellulose triacetate film (TD-80U, manufactured by Fuji Photo Film Co., Ltd.) in a dry layer thickness of 2.0 μm, and after the solvent was dried, the coated layer was subjected to irradiation with UV rays of the quantity of radiation of 140 mJ. Further, 100 mass parts of a UV ray-curing type resin (DPHA manufactured by Nippon Kayaku Co., Ltd., refractive index: 1.51), 3 mass parts of a curing initiator (Irgacure 907, manufactured by Ciba Geigy Japan Limited), 6 mass parts of crosslinked styrene beads (particle size: 3.5 μm, refractive index: 1.61, manufactured by Soken Kagaku Co., Ltd.) as light-transmitting fine particles, and 16 mass parts of styrene beads (particle size: 1.3 μm, refractive index: 1.60, manufactured by Soken Kagaku Co., Ltd.) were mixed and dissolved in methyl ethyl ketone/cyclohexanone (6/4 by mass ratio) so as to reach the solid content of 22%. The thus-prepared coating solution was coated on the first layer in a dry layer thickness of 3.0 μm, and after the solvent was dried, the coated layer was cured by irradiation with UV rays using an air cooled metal halide lamp (manufactured by Eye Graphics Co., Ltd.) of 160 W/cm at illumination intensity of 400 mW/cm$^2$ and the quantity of radiation of 300 mJ/cm$^2$, thereby a light-diffusing film (HKF-03) was prepared.

The haze value of HKF-03 measured according to JIS-K-7105 with a measuring apparatus (HR-100, manufactured by Murakami Shikisai Gijutsu Kenkyusho) was 56%, which was appropriate haze.

Example 6

As the light-transmitting resin constituting a light-diffusing layer, 100 mass parts of UV ray-curing type resin (DPHA manufactured by Nippon Kayaku Co., Ltd., refractive index: 1.51), 3 mass parts of a curing initiator (Irgacure 907, manufactured by Ciba Geigy Japan Limited), and 11 mass parts of silica particles (particle size: 1.0 μm, refractive index: 1.43, manufactured by Nippon Shokubai Co., Ltd.) as light-transmitting fine particles were mixed and dissolved in methyl ethyl ketone/cyclohexanone (6/4 by mass ratio) so as to reach the solid content of 11 mass %. The thus-prepared coating solution was coated on a cellulose triacetate film (TD-80U, manufactured by Fuji Photo Film Co., Ltd.) in a dry layer thickness of 2.0 μm, and after the solvent was dried, the coated layer was subjected to irradiation with UV rays of the quantity of radiation of 140 mJ. Further, 100 mass parts of a UV ray-curing type resin (DPHA manufactured by Nippon Kayaku Co., Ltd., refractive index: 1.51), 3 mass parts of a curing initiator (Irgacure 907, manufactured by Ciba Geigy Japan Limited), 6 mass parts of styrene beads (particle size: 3.5 μm, refractive index: 1.60, manufactured by Soken Kagaku Co., Ltd.) as light-transmitting fine particles, and 16 mass parts of styrene beads (particle size: 1.3 μm, refractive index: 1.60, manufactured by Soken Kagaku Co., Ltd.) were mixed and dissolved in methyl ethyl ketone/cyclohexanone (6/4 by mass ratio) so as to reach the solid content of 22%. The thus-prepared coating solution was coated on the first layer in a dry layer thickness of 3.0 μm, and after the solvent was dried, the coated layer was cured by irradiation with UV rays using an air cooled metal halide lamp (manufactured by Eye Graphics Co., Ltd.) of 160 W/cm at illumination intensity of 400 mW/cm$^2$ and the quantity of radiation of 300 mJ/cm$^2$, thereby a light-diffusing film (HKF-04) was prepared.

The haze value of HKF-04 measured according to JIS-K-7105 with a measuring apparatus (HR-100, manufactured by Murakami Shikisai Gijutsu Kenkyusho) was 48%, which was appropriate haze.

Example 7

Preparation of Low Refractive Index Layer Coating Solution

To 2,240 g of a thermo-crosslinkable fluorine-containing polymer (JN-7228, solid content concentration: 6 mass %, a methyl ethyl ketone solution, manufactured by JSR Co.) having a refractive index of 1.42, 192 g of MEK-ST (average particle size: 10 to 20 nm, a methyl ethyl ketone dispersion of SiO$_2$ sol in solid content concentration of 30 mass %, manufactured by Nissan Chemical Industries, Ltd.), 2,224 g of methyl ethyl ketone and 144 g of cyclohexanone were added and stirred. The reaction mixture was filtered through a polypropylene filter having a pore diameter of 1 μm (PPE-01), thereby a low refractive index layer coating solution was prepared.

The thus-prepared low refractive index layer coating solution was coated on light-diffusing film HKF-02 produced in Example 4 with a bar coater, the coated layer was dried at 80° C., and further thermo-crosslinking was performed at 120° C. for 8 minutes to form a low refractive index layer, thus a light-diffusing film (HKF-05) having a glare-shielding property was obtained.

An adaptor (ARV-474) was attached to a spectrophotometer V-550 (manufactured by Nippon Bunko Co., Ltd.), and the mirror reflectivity of outgoing angle −5° at an incident angle of 5° of HKF-05 was measured in the wavelength region of 380 to 780 nm, and the average reflectance obtained in the wavelength region of from 450 to 650 nm was 2.2%.

Example 8

Iodine was adsorbed onto a stretched polyvinyl alcohol film to prepare a polarizing film. HKF-01 prepared in Example 3 was subjected to saponification treatment, and HKF-01 was stuck on one side of the polarizing film with a polyvinyl alcohol-based adhesive so that the transparent substrate film (cellulose triacetate) of HKF-01 faced the polarizing film. A commercially available cellulose triacetate film (Fuji Tack TD80UF, manufactured by Fuji Photo Film Co., Ltd.) was subjected to saponification treatment, and stuck on the other side of the polarizing film with a polyvinyl alcohol-based adhesive, thereby a polarizing plate having a light-diffusing layer (HKH-01) was prepared.

Example 9

Iodine was adsorbed onto a stretched polyvinyl alcohol film to prepare a polarizing film. HKF-03 prepared in Example 5 was subjected to saponification treatment, and HKF-03 was stuck on one side of the polarizing film with a polyvinyl alcohol-based adhesive so that the transparent substrate film (cellulose triacetate) of HKF-03 faced the polarizing film. Further, the following optical compensating film (KH-01) was stuck on the other side of the polarizing film with a polyvinyl alcohol-based adhesive so that the cellulose acetate film faced the polarizing film. The transmitting axis of the polarizing film and the lagging axis of KH-01 were arranged in parallel, thereby a polarizing plate having a light-diffusing layer (HKH-02) was prepared.

Preparation of KH-01

The following components were put into a mixing tank, and stirred with heating to dissolve each component, thereby a cellulose acetate solution was prepared.

Composition of Cellulose Acetate Solution

| | |
|---|---|
| Cellulose acetate of degree of acetylation of 60.9% | 100 mass parts |
| Triphenylphosphate (plasticizer) | 7.8 mass parts |
| Biphenyldiphenylphosphate (plasticizer) | 3.9 mass parts |
| Methylene chloride (first solvent) | 300 mass parts |
| Methanol (second solvent) | 54 mass parts |
| 1-Butanol (third solvent) | 11 mass parts |

A retardation increasing agent shown below (25 mass parts) as a wavelength dispersion inhibitor, 80 mass parts of methylene chloride and 20 mass parts of methanol were put into another mixing tank and stirred with heating, thereby a solution of retardation increasing agent was prepared.

The above-prepared retardation increasing agent (7 mass parts) was added to 493 mass parts of the cellulose acetate solution and stirred thoroughly to prepare a dope. The addition amount of the retardation increasing agent was 1.5 mass parts per 100 mass parts of cellulose acetate.

Retardation Increasing Agent

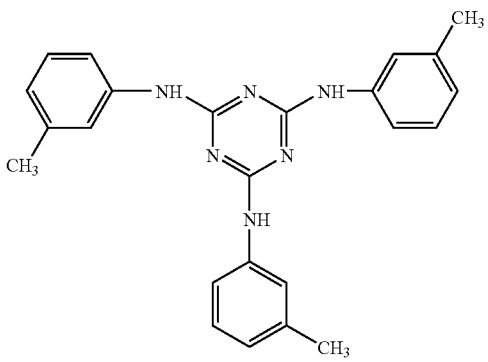

The above-prepared dope was cast using a band-casting machine. The cast film was dried for 1 minute from the time when the film temperature on the band reached 40° C. The film was dried with dry air of 140° C. after being peeling, and a cellulose acetate film (thickness: 90 μm) having a residual solvent amount of 0.3 mass % was obtained.

As a result of measurement of optical characteristics of the above-prepared cellulose acetate film (CAF-01), Reretardation value was 5 nm and Rth retardation value was 80 nm.

The measurement was performed using an ellipsometer (M-150, manufactured by Nippon Bunko Co., Ltd.) at wavelength of 550 nm.

The cellulose acetate film was coated with 1.5N potassium hydroxide/(water/IPA/PG=14/86/15 mol %) in a coating amount of 5 ml/m², maintained at 60° C. for about 10 seconds, then potassium hydroxide left on the film surface was washed with water, and dried. The surface energy of the cellulose acetate film obtained from the contact angle was 63 mN/m.

A coating solution having the composition shown below was coated on the cellulose acetate film with a #16 wire bar coater in a coating amount of 28 ml/m². The coated layer was dried with a hot air of 60° C. for 60 seconds, further, at 90° C. for 150 seconds.

The formed layer was then subjected to rubbing treatment in the parallel direction to the machine direction of the cellulose acetate film.

Composition of Coating Solution of Orientation Layer

| | |
|---|---|
| Modified polyvinyl alcohol having the structure shown below | 10 mass parts |
| Water | 371 mass parts |
| Methanol | 119 mass parts |
| Glutaraldehyde (crosslinking agent) | 0.5 mass parts |

Modified Polyvinyl Alcohol

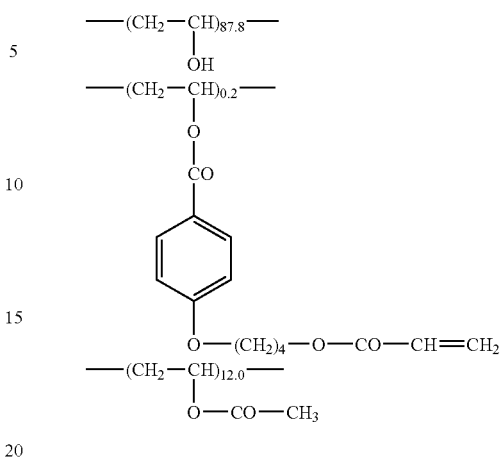

Formation of Optical Anisotropic Layer

A coating solution was prepared by dissolving 41.09 g of a discotic compound (liquid crystal) having the structure shown below, 4.06 g of ethylene oxide-modified trimethylolpropane triacrylate (V #360, manufactured by Osaka Yuki Kagaku Co., Ltd.), 0.90 g of cellulose acetate butyrate (CAB551-0.2, manufactured by Eastman Chemical Japan Ltd.), 0.23 g of cellulose acetate butyrate (CAB531-1, manufactured by Eastman Chemical Japan Ltd.), 1.35 g of a photo-polymerization initiator (IRGACURE® 907, manufactured by Ciba Geigy Japan Limited), and 0.45 g of a sensitizer (Kaya Cure DETX, manufactured by Nippon Kayaku Co., Ltd.) in 102 g of methyl ethyl ketone. The above coating solution was coated on the orientation layer with a #3.6 wire bar coater. The cellulose acetate film was heated at 130° C. for 2 minutes in a constant temperature zone, thereby the discotic compound was oriented. The discotic compound was then polymerized under 60° C. atmosphere by UV irradiation with a high pressure mercury lamp of intensity of 120 W/cm for 1 minute, and then the film was allowed to be cooled to room temperature. Thus, an optical an isotropic layer was formed, and an optical compensating sheet (KH-01) was produced.

Re retardation value measured at wavelength of 550 nm of the optical anisotropic layer was 43 nm. The angle (angle of inclination) between the plane of the disc and the plane of the first transparent support was 42° on average.

Discotic Liquid Crystal Compound

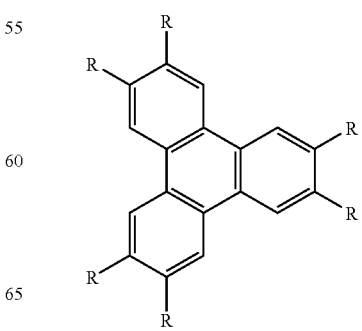

-continued

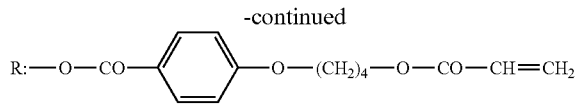

Example 10

A polarizing plate having a light-diffusing layer (HKH-03) was prepared in the same manner as in Example 9 except for using HKF-05 prepared in Example 7 in place of HKF-03 prepared in Example 5.

Example 11

A pair of polarizing plates provided in the liquid crystal display (6E-A3, manufactured by Sharp Corporation) using a TN type liquid crystal cell was peeled off and, in place of them, the polarizing plate (HKH-02) prepared in Example 9 was stuck on the viewer's side with an adhesive so that KH-01 faced the liquid crystal cell side. On the back light side was stuck a polarizing plate (HKH-S1) shown below. The transmitting axis of the polarizing plate on the viewer's side and the transmitting axis of the polarizing plate on the back light side were arranged so as to become O mode.

The angle of visibility of each of the prepared liquid crystal displays was measured in eight stages of from black display (L1) to white display (L8) with a measuring apparatus (EZ-Contrast 160D, manufactured by ELDIM Co.). The results obtained are shown in Table 2 below.

Preparation of Polarizing Plate (HKH-S1)

Iodine was adsorbed onto a stretched polyvinyl alcohol film to prepare a polarizing film. KH-01 prepared in Example 4 was stuck on the polarizing film with an adhesive so that CAF-01 faced the polarizing film, and the lagging axis and the transmitting axis of the polarizing film were in parallel.

A commercially available cellulose triacetate film (Fuji Tack TD80UF, manufactured by Fuji Photo Film Co., Ltd.) was subjected to saponification treatment, and stuck on the other side of the polarizing film with a polyvinyl alcohol-based adhesive.

Thus, a polarizing plate (HKH-12) was prepared.

Example 12

A pair of polarizing plates provided in the liquid crystal display (6E-A3, manufactured by Sharp Corporation) using a TN type liquid crystal cell was peeled off and, in place of them, the polarizing plate (HKH-03) prepared in Example 10 was stuck on the viewer's side with an adhesive so that KH-01 faced the liquid crystal cell side. On the back light side was stuck a polarizing plate (HKH-S1) shown above. The transmitting axis of the polarizing plate on the viewer's side and the transmitting axis of the polarizing plate on the back light side were arranged so as to become O mode.

The angle of visibility of each of the prepared liquid crystal displays was measured in eight stages of from black display (L1) to white display (L8) with a measuring apparatus (EZ-Contrast 160D, manufactured by ELDIM Co.). The results obtained are shown in Table 2 below.

TABLE 1

| Liquid Crystal Display | Angle of Visibility (contrast ratio >10, there is no reverse of gradation) | | | Reflection of Outer Light |
|---|---|---|---|---|
| | Upper Part | Lower Part | Left and Right | |
| Example 9 | 70° | 65° | 160° | B |
| Example 10 | 75° | 60° | 160° | A |

Note:
Reverse of gradation of the black side: Reverse between L1 and L2
Reflection of outer light A: Not observed at all
Reflection of outer light B: Observed a little but images are clear than outer light

INDUSTRIAL APPLICABILITY

A liquid crystal display equipped with the polarizing plate according to the present invention is widened in the angle of visibility (in particular, the downward angle of visibility) hardly accompanied by thickening of the thickness of a liquid crystal panel, lowering of contrast due to variation of a visual angle, gradation reverse, black-and-white reverse, and hue variation. Further, the polarizing plate according to the present invention is excellent in durability.

The invention claimed is:
1. A light-scattering film comprising:
   a transparent substrate film; and
   a light-scattering layer containing a light-transmitting resin and light-transmitting fine particles in the light-transmitting resin,
   wherein the light-scattering layer has an inner haze value due to inner diffusion of from 30 to 95%,
   wherein the light-transmitting fine particles has a particle size distribution having at least two peaks, and the difference of a refractive index of the light-transmitting fine particles and that of the light-transmitting resin is from 0.02 to 0.15, and
   wherein the light-scattering layer has a total haze value of 40% or more.
2. The light-scattering film as claimed in claim 1, wherein the light-scattering layer has a surface haze value (hs) due to surface unevenness of more than 0.5 and less than 30.
3. The light-scattering film as claimed in claim 1,
   wherein one peak of the particle size distribution of the light-transmitting fine particles is in the region of from 0.5 to 2.0 µm, and another one peak is in the region of from 2.5 to 5.0 µm.
4. A glare-shielding film comprising:
   a light-scattering film; and
   a low refractive index layer having a refractive index of from 1.35 to 1.45,
   wherein the light-scattering film comprises:
   a transparent substrate film; and
   a light-scattering layer containing a light-transmitting resin and light-transmitting fine particles in the light-transmitting resin,
   wherein the light-scattering layer has an inner haze value due to inner diffusion of from 30 to 95%,
   wherein the light-transmitting fine particles has a particle size distribution having at least two peaks, and the difference of a refractive index of the light-transmitting fine particles and that of the light-transmitting resin is from 0.02 to 0.15, and wherein the light-scattering layer has a total haze value of 40% or more.

5. The glare-shielding film according to claim 4, wherein the low refractive index layer includes a hardened product of composition containing: a fluorine-containing compound capable of crosslinking by one of heat and ionizing radiation; and inorganic fine particles.

6. A polarizing plate comprising:
a polarizer; and
the light-scattering film according to claim 1.

7. A liquid crystal display comprising the polarizing plate according to claim 6.

8. The liquid crystal display according to claim 7, wherein the polarizing plate is arranged on a viewer's side of the liquid crystal display, and the light-scattering film is arranged in the viewer's side than the polarizer.

9. A polarizing plate comprising:
a polarizer; and
the glare-shielding film according to claim 4.

10. A liquid crystal display comprising the polarizing plate according to claim 9.

11. The liquid crystal display according to claim 10, wherein the polarizing plate is arranged on a viewer's side of the liquid crystal display, and the glare-shielding film is arranged in the viewer's side than the polarizer.

* * * * *